US008621752B1

(12) United States Patent
Brim, III

(10) Patent No.: US 8,621,752 B1
(45) Date of Patent: Jan. 7, 2014

(54) PRUNING CLIPPER FOR DISPENSING A CHEMICAL TREATMENT

(76) Inventor: J. Croswell Brim, III, Marietta, GA (US)

(*) Notice: Subject to any disclaimer, the term of this patent is extended or adjusted under 35 U.S.C. 154(b) by 862 days.

(21) Appl. No.: 12/567,148

(22) Filed: Sep. 25, 2009

Related U.S. Application Data

(63) Continuation-in-part of application No. 12/237,964, filed on Sep. 25, 2008, now Pat. No. 8,181,351.

(60) Provisional application No. 60/975,019, filed on Sep. 25, 2007.

(51) Int. Cl.
*A01G 3/00* (2006.01)

(52) U.S. Cl.
USPC .............................. 30/123.3; 30/131; 47/1.7

(58) Field of Classification Search
USPC ........ 30/123.3, 131, 132, 134; 47/1.7; 83/169
See application file for complete search history.

(56) References Cited

U.S. PATENT DOCUMENTS

| | | | |
|---|---|---|---|
| 773,743 A | 11/1904 | Von Hoffmann | |
| 1,056,046 A | 3/1913 | Myers | |
| 1,640,635 A | 8/1927 | Atkins | |
| 2,870,573 A | 1/1959 | Scadden | |
| 3,675,689 A * | 7/1972 | Rice | 30/379 |
| 4,073,059 A | 2/1978 | Wallace | |
| 4,219,963 A | 9/1980 | Mullett | |
| 4,341,016 A | 7/1982 | Harrison | |
| 4,602,432 A | 7/1986 | Vosbikian | |
| 4,783,907 A | 11/1988 | Ravaux | |
| 4,891,882 A | 1/1990 | Bloom et al. | |
| 5,088,198 A | 2/1992 | Drusiani | |
| 5,263,254 A | 11/1993 | Orthey | |
| 5,471,745 A | 12/1995 | Wendell | |
| 5,606,822 A | 3/1997 | Dearhammer | |
| 5,743,018 A | 4/1998 | Wang | |
| 6,523,264 B1 | 2/2003 | Albert et al. | |
| 6,532,668 B1 | 3/2003 | Bloom et al. | |
| 6,675,481 B2 | 1/2004 | Wu | |
| 6,952,876 B2 | 10/2005 | Frazer | |

OTHER PUBLICATIONS

Felco 19 Operating Instructions, published and available for purchase in the United States as of Mar. 16, 2006.

(Continued)

*Primary Examiner* — Omar Flores Sanchez
(74) *Attorney, Agent, or Firm* — Smith, Gambrell & Russell, LLP

(57) ABSTRACT

A pruning clipper includes a pair of handles each having a distal end and a proximal end, with the handles being pivotally connected to each other close to the proximal ends of the handles. A first blade is connected to the proximal end of one of said handles, and a second blade is connected to the proximal end of the other handle. A chemical storage tank may be positioned within the distal end of one of said handles for storing a chemical to be selectively applied to vegetation. A bulb is connected to the proximal end of one of the handles, with the bulb being connected to the tank using a first connecting tube. A dispensing member extends along one of the blades and beyond the blade to a dispersion point, and the dispensing member is connected to the bulb using a second connecting tube. The user will thus cut the vegetation using the clippers, and selectively dispense an herbicide at the precise time and point as desired by the user.

6 Claims, 35 Drawing Sheets

(56) References Cited

OTHER PUBLICATIONS http://www.felco.com/felco/pages/product.page?name=FELCO%2019, website for Felco 19 Pruning Shears, believed to be published and available in the United States as of Mar. 16, 2006.

Felco 19 Product Specifications, published and available in the United States as of Mar. 16, 2006.

* cited by examiner

US 8,621,752 B1

PRUNING CLIPPER FOR DISPENSING A CHEMICAL TREATMENT

CROSS REFERENCE TO RELATED PATENT APPLICATION

This non-provisional application is a continuation-in-part of patent application Ser. No. 12/237,964, filed on Sep. 25, 2008, now U.S. Pat. No. 8,181,351 which claims priority from provisional patent application 60/975,019, filed on Sep. 25, 2007, said applications being relied upon and incorporated herein by reference.

BACKGROUND OF THE INVENTION

A variety of pruning shears are known and commonly used in cutting and trimming plants and trees, such as U.S. Pat. Nos. 4,073,059 and 5,743,018. While these devices are useful to remove unwanted growth, they do not operate to prevent future growth on or near the plant or tree, and thus require the user to monitor the area and return to cut additional unwanted growth.

There are generally three types of hand pruners: bypass pruners, anvil pruners and ratchet pruners. Bypass pruners use two curved blades that bypass each other in the same manner as a pair of scissors. One blade is sharpened on the outside edge and it slips by a thicker unsharpened blade. Anvil pruners have a single straight cutting blade that closes down on a flat edge or anvil. Anvil pruners have a slicing action similar to a knife against a cutting board and work well removing tough, dead wood. Ratchet pruners are similar to anvil pruners, but include a mechanism that performs the cutting action in stages to provide more leverage for the user.

SUMMARY OF THE INVENTION

A pruning clipper for dispensing a chemical treatment, such as a herbicide or insecticide, on plants is disclosed herein. The clipper includes a pair of handles each having a distal end and a proximal end, with the handles being pivotally connected to each other close to the proximal ends of the handles. A first blade is connected to the proximal end of one of said handles, and a second blade is connected to the proximal end of the other handle. A chemical storage tank is positioned within or as a part of one of said handles for storing a chemical to be selectively applied to vegetation. A bulb is connected to the proximal end of one of the handles in a trigger position relative to the user's hand, with the bulb being connected to the tank using a first connecting tube. A dispensing member extends proximate one of the blades and beyond the blade to a dispersion point, and the dispensing member is connected to the bulb using a second connecting tube. As a result, the user will be able to cut the vegetation as desired using the clippers, and selectively dispense the herbicide or insecticide as desired by the user when the user squeezes the trigger bulb.

DETAILED DESCRIPTION OF THE INVENTION

Figure 1:
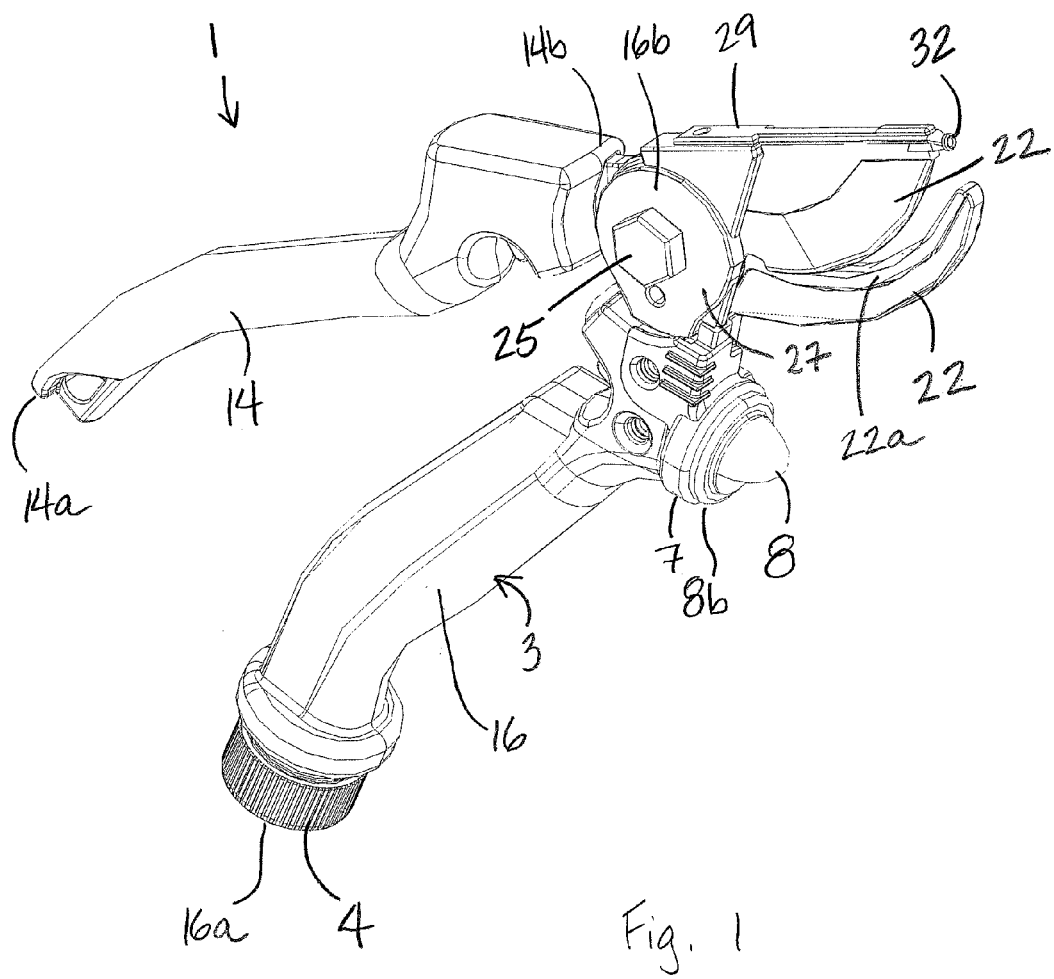
FIGS. 1-4 are perspective views of a pruning clipper for dispensing a chemical treatment.
Figure 2:
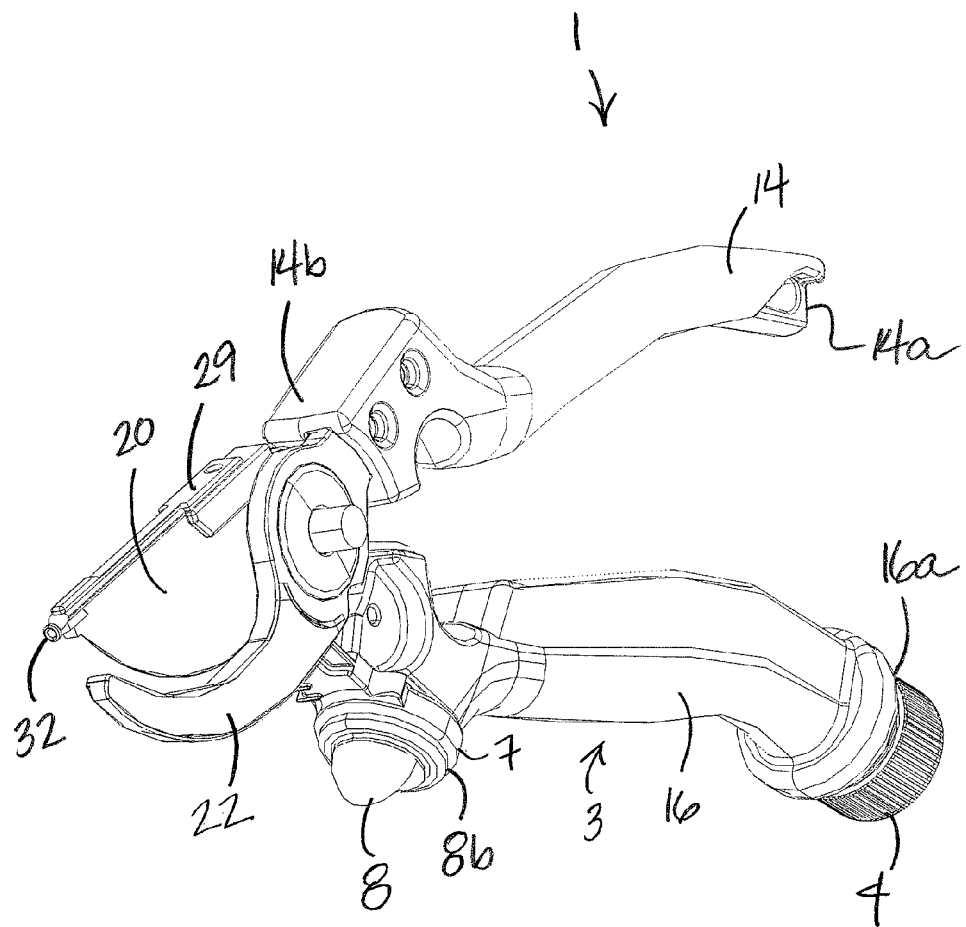

Looking to FIGS. 1-34, an improved pruning clipper or pruning shear 1 providing a means for dispensing a chemical treatment in a precise area is illustrated. Namely, FIG. 1 shows the pruning clipper 1 having a first arm handle 14 and a second arm handle 16. The handles 14, 16 are pivotally connected to each other using a connecting member 25, such as a bolt, screw, or similar means, connected to a nut 26 or similar mechanism. The first arm handle 14 has a distal end 14a and a proximal end 14b, with a first blade 22 or engaging surface (such as an anvil blade) connected to the proximal end 14b of the first arm handle 14 (see FIGS. 28-32). Likewise, the second arm handle 16 has a distal end 16a and a proximal end 16b, with a second cutting blade 20 having a cutting edge 20a being connected to the proximal end 16b of the second arm handle 16 using a blade connector 27. The cutting blade 20 may be a conventional blade having the respective cutting edge 20a, or any other type of blade suitable for cutting objects such as plants or tree limbs. Likewise, the first cutting blade 22 may be a hook blade or flat edge or anvil have an cutting edge 22a that is engaged by the cutting blade 20. Thus, it is noteworthy that the pruners 1 may be in various forms, such as bypass pruners, anvil pruners, or ratchet pruners as noted above for the desired results, as well as any other pruner design. For example, if a by-pass pruner design is implemented, the pruner 1 will provide a clean cut using two curved blades that bypass each other (such as a pair of scissors). In contrast, if an anvil pruner design is implemented, the pruner 1 will have a single straight cutting blade that closes down on a flat edge or anvil.

Figure 3:
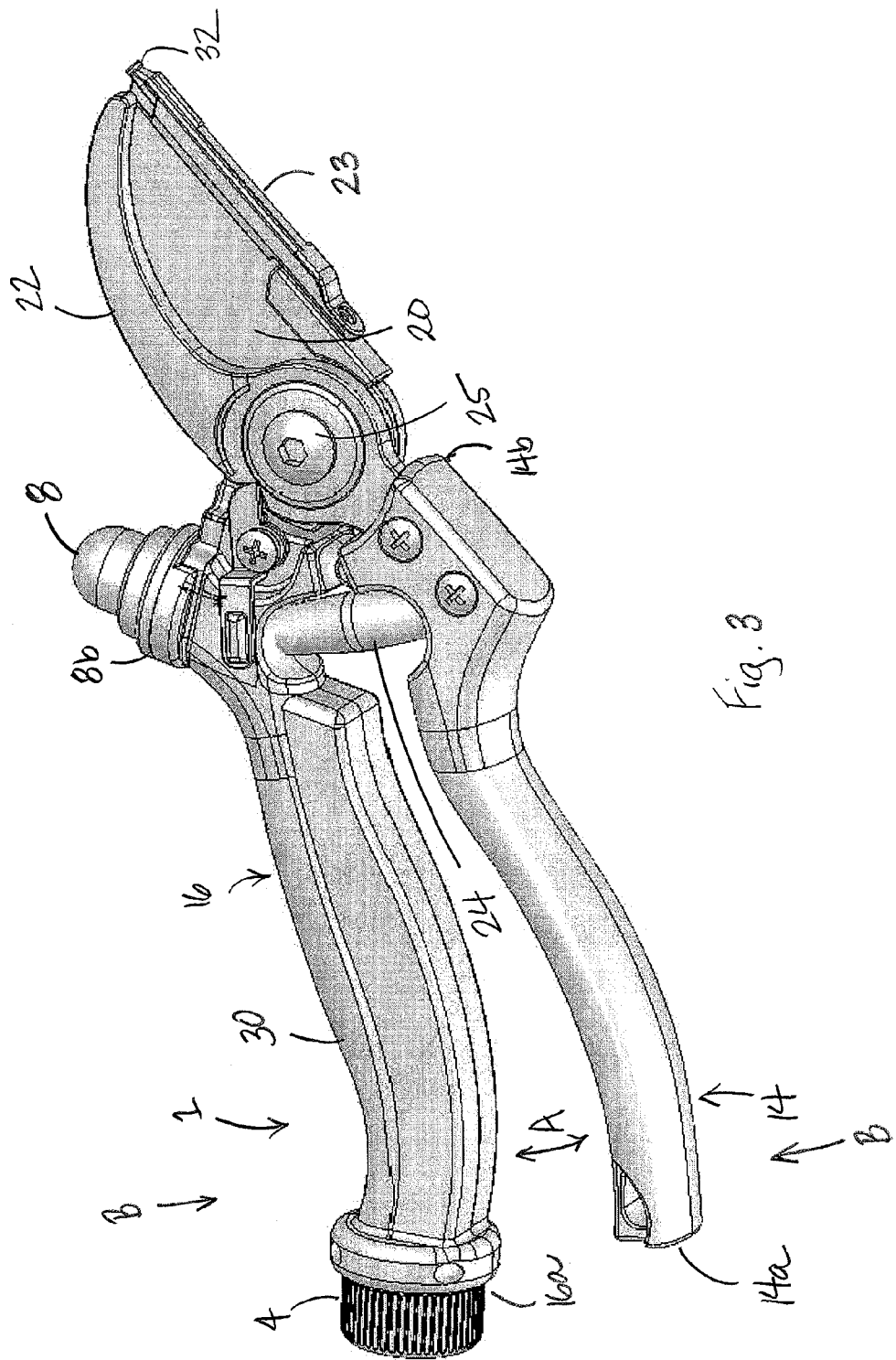
Figure 4:
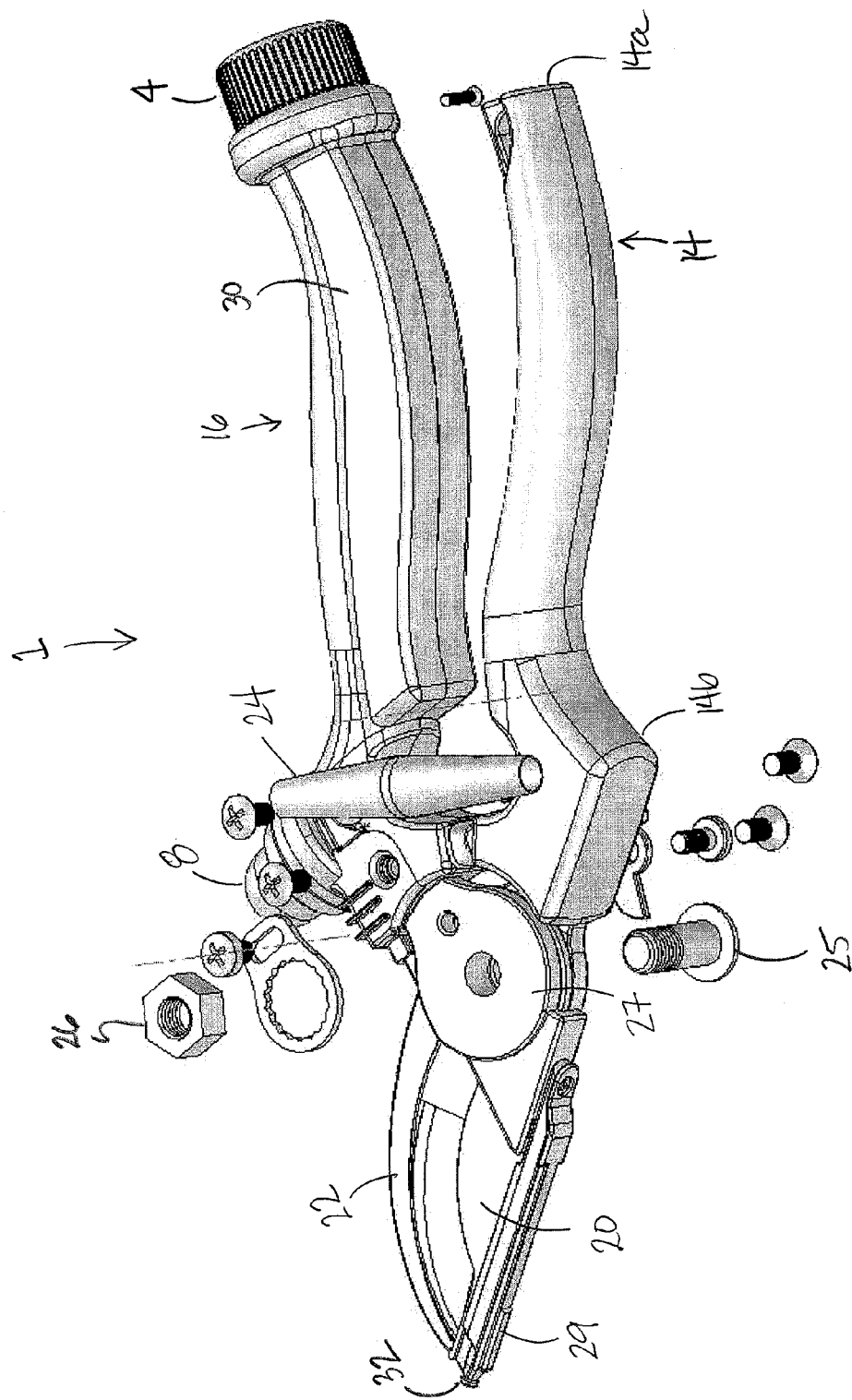
Figure 5:
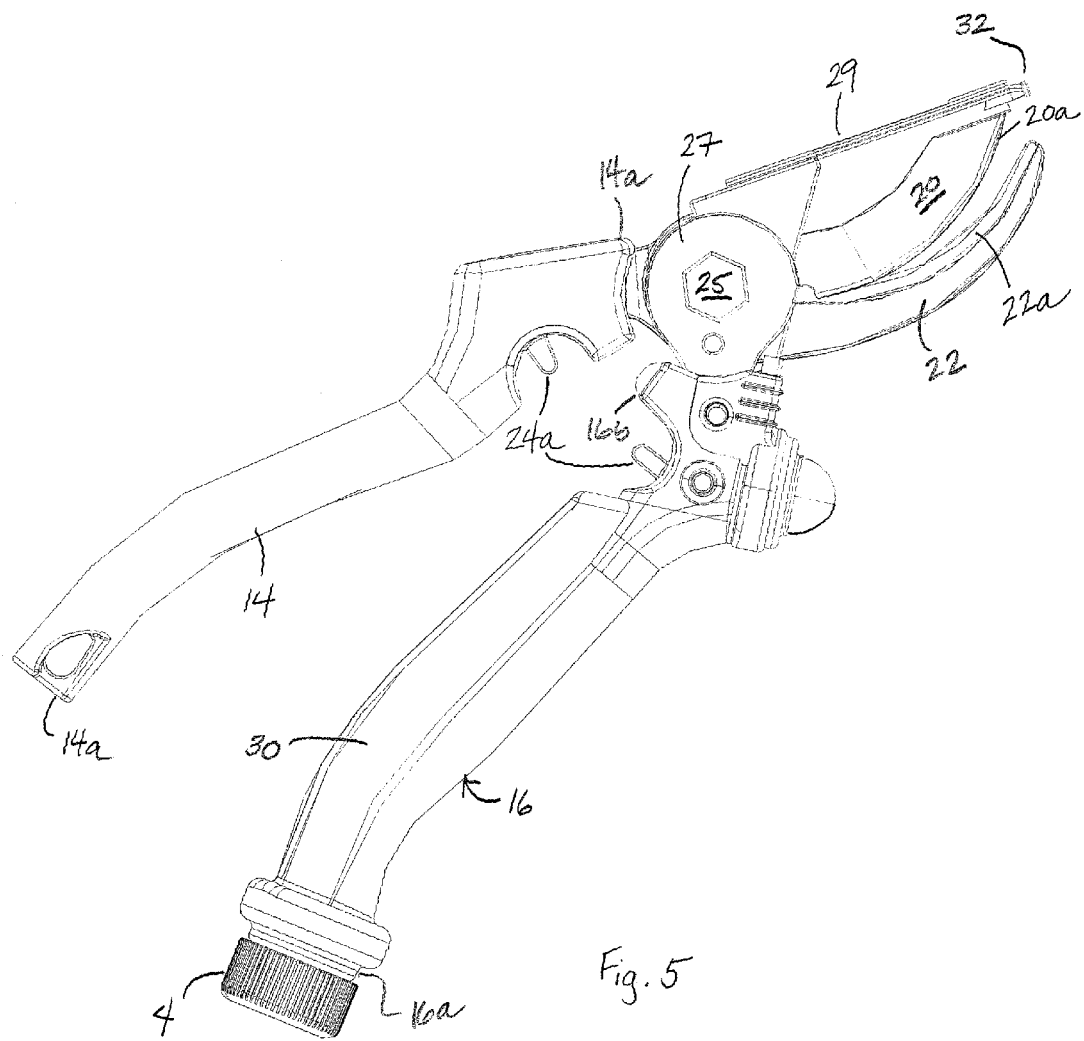
FIG. 5 is a first side elevational view of the pruning clipper.
Figure 6:
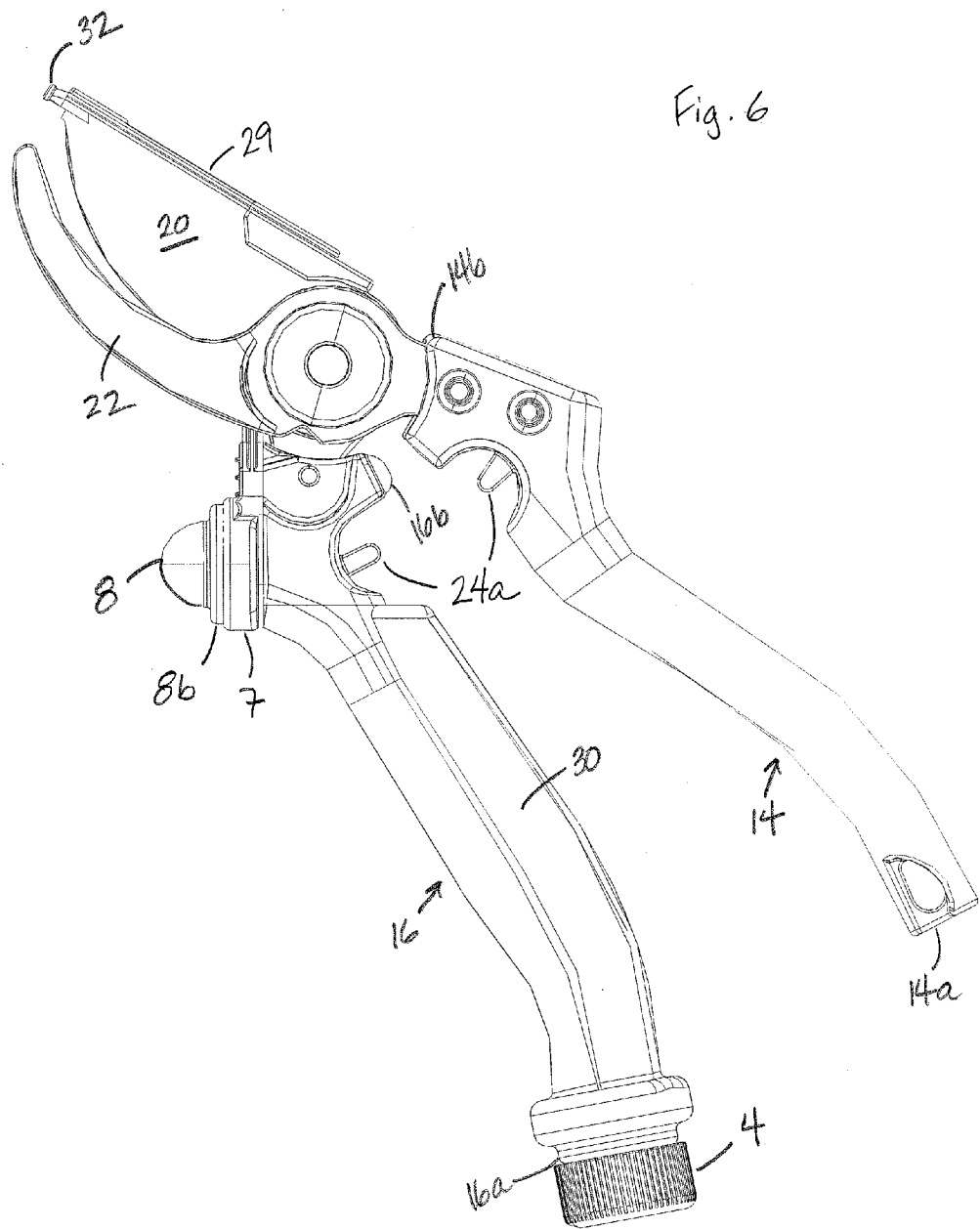
FIG. 6 is a second side elevational view of the pruning clipper.
Figure 7:
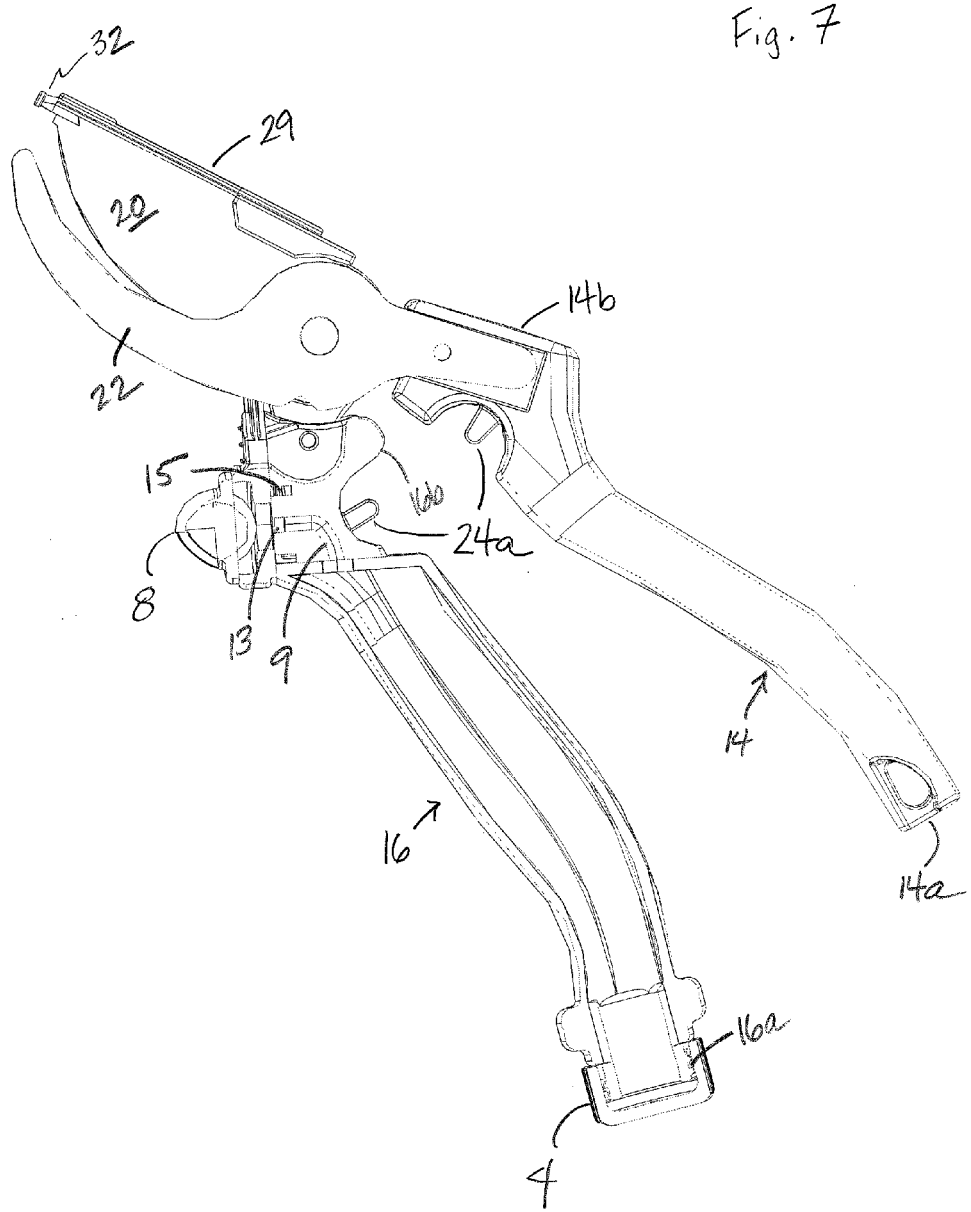
FIG. 7 is a sectional view of the pruning clipper of FIG. 6.
Figure 8:
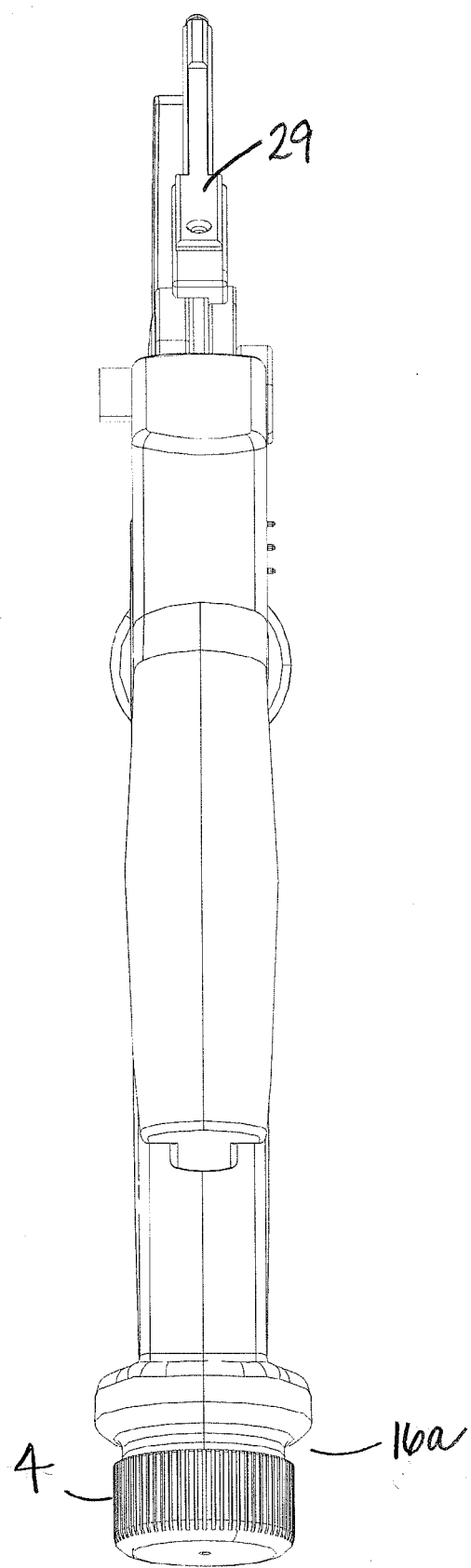
FIG. 8 is a rear elevational view of the pruning clipper of FIG. 6.
Figure 9:
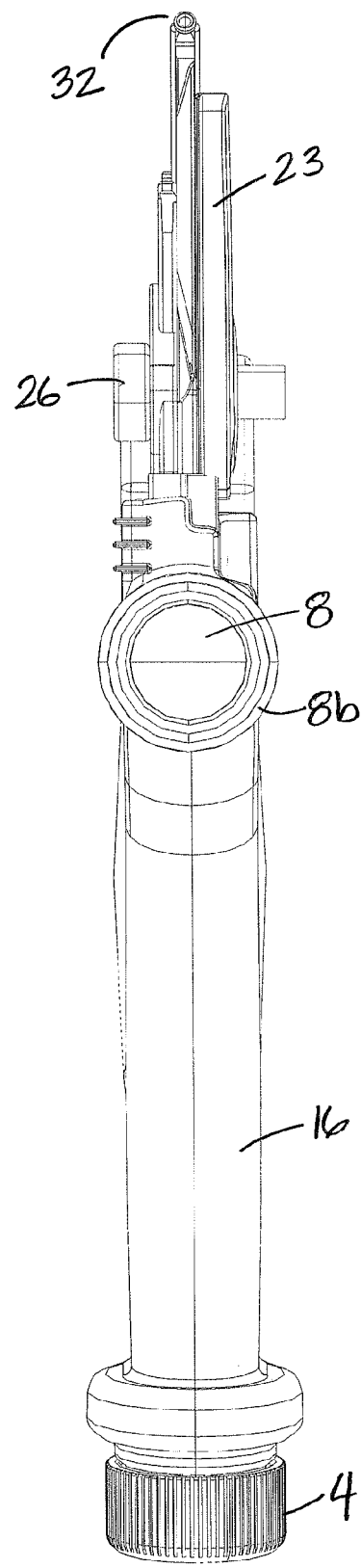
FIG. 9 is a front elevational view of the pruning clipper of FIG. 6.
Figure 10:
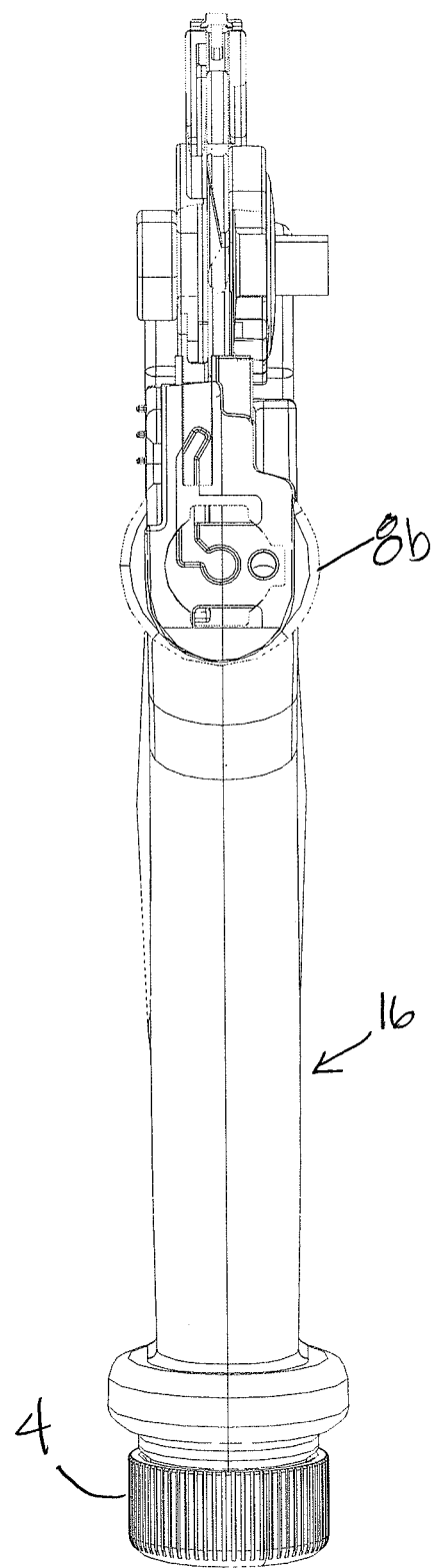
FIG. 10 is a sectional view of the pruning clipper of FIG. 9.
Figure 11:
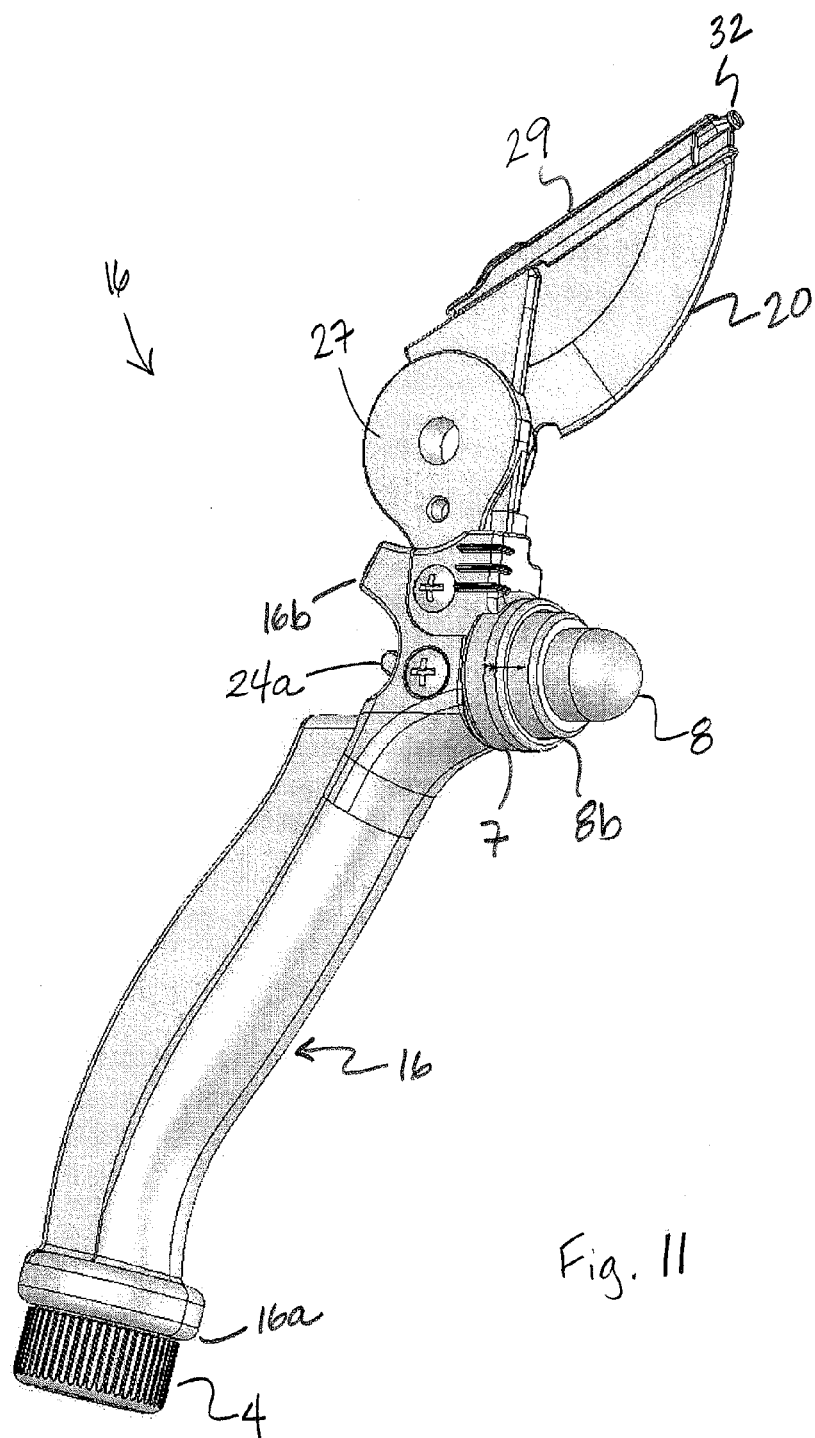
FIGS. 11 and 12 are elevational views of the second arm handle and blade illustrated in FIGS. 1-4.
Figure 12:
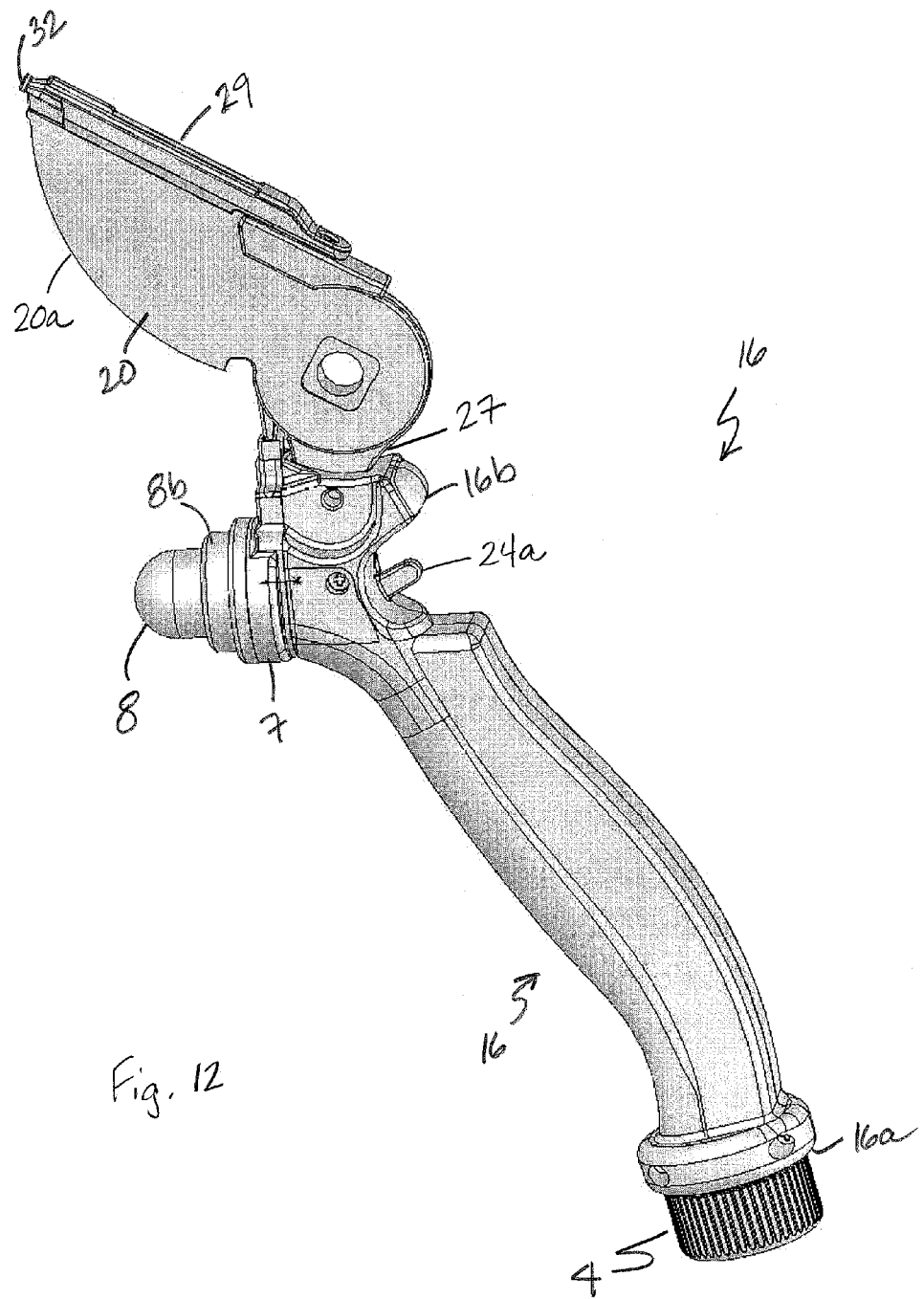
Figure 13:
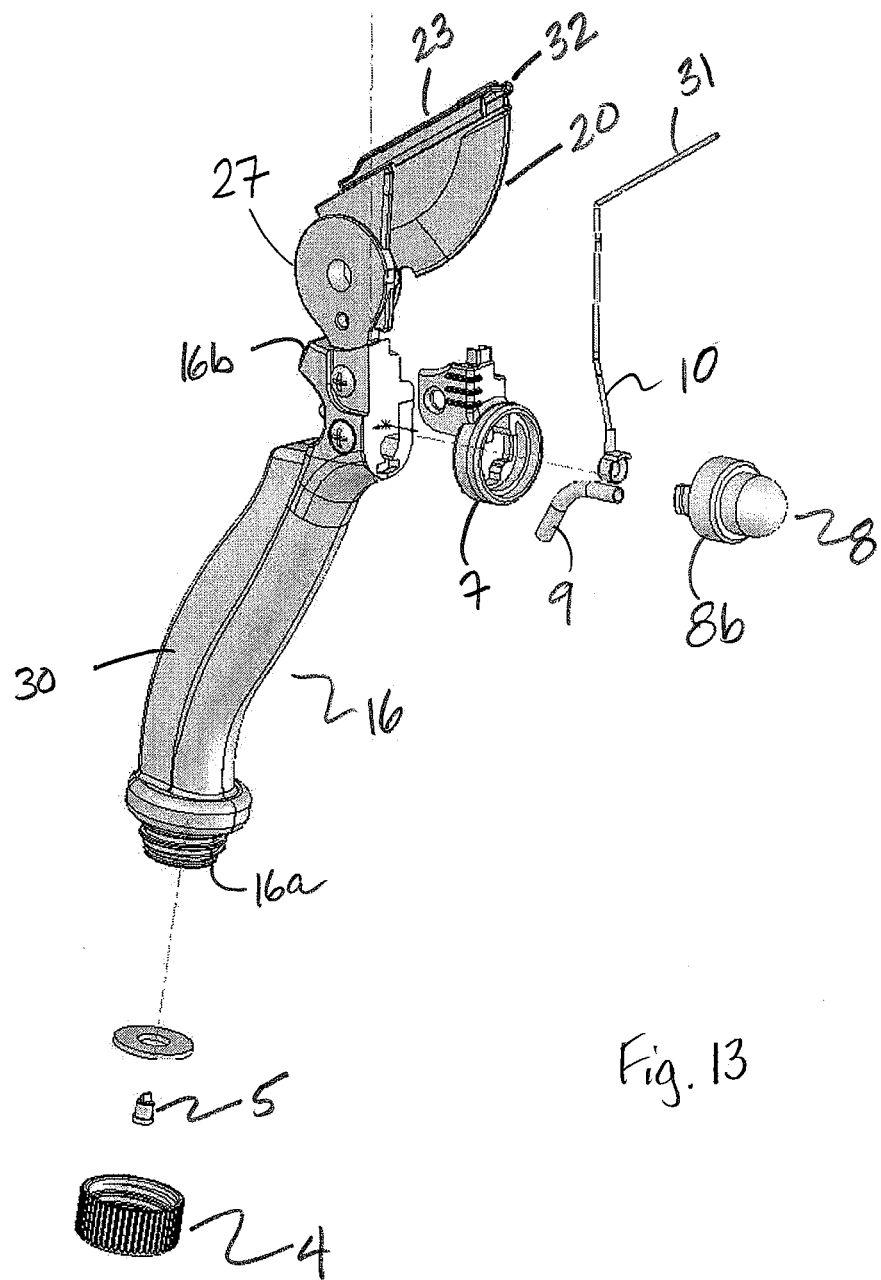
FIGS. 13-20 are exploded views of the second arm handle and blade illustrated in FIGS. 11 and 12.
Figure 14:
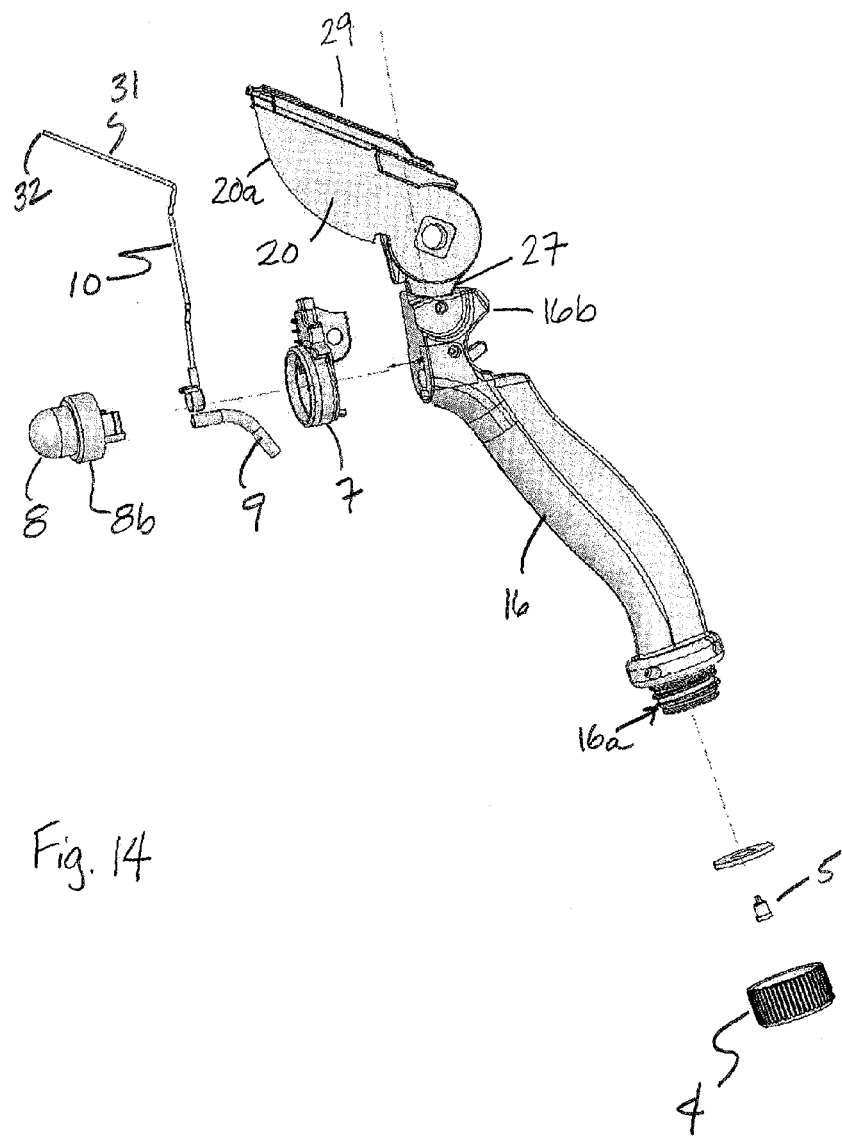
Figure 15:
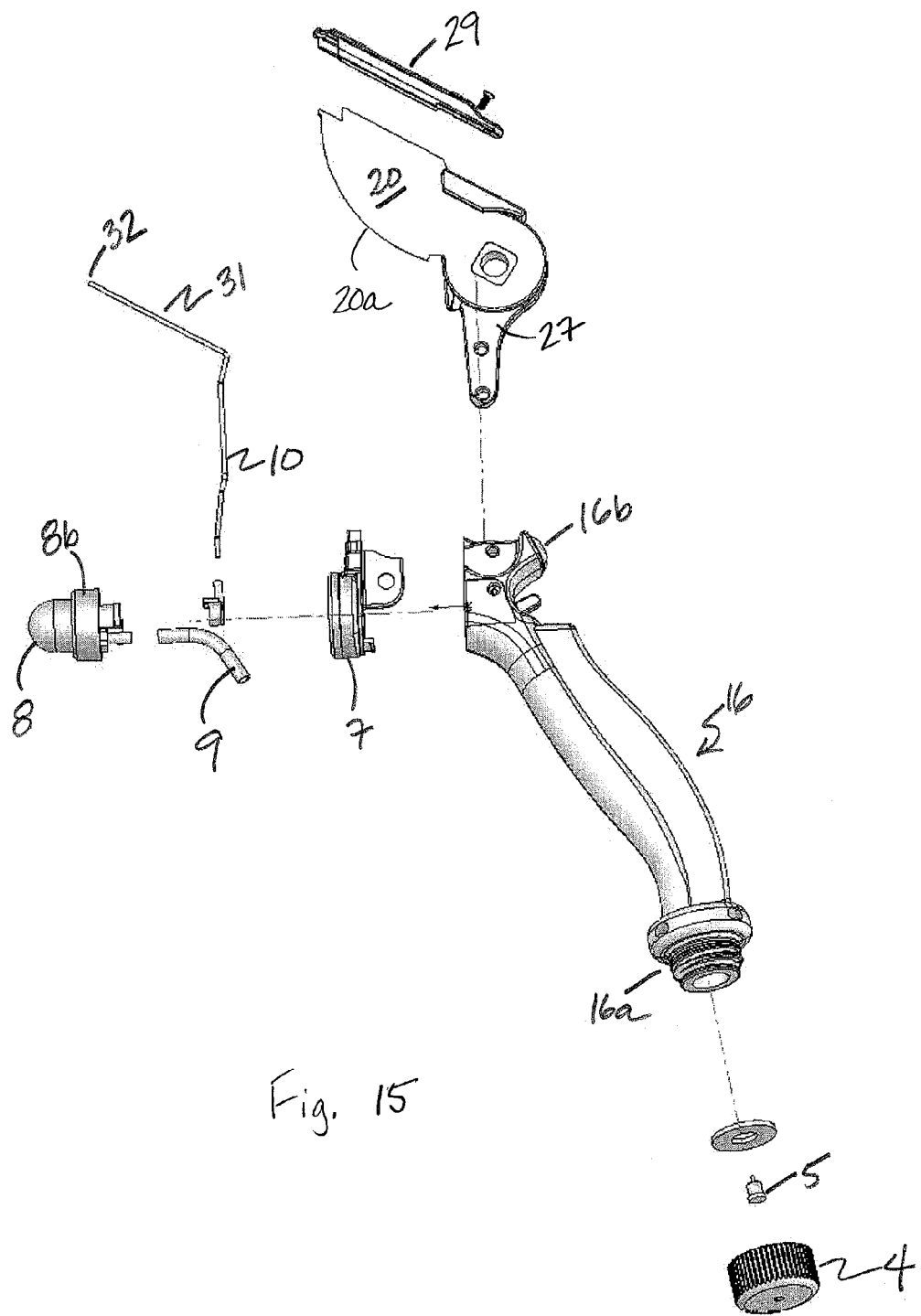
Figure 16:
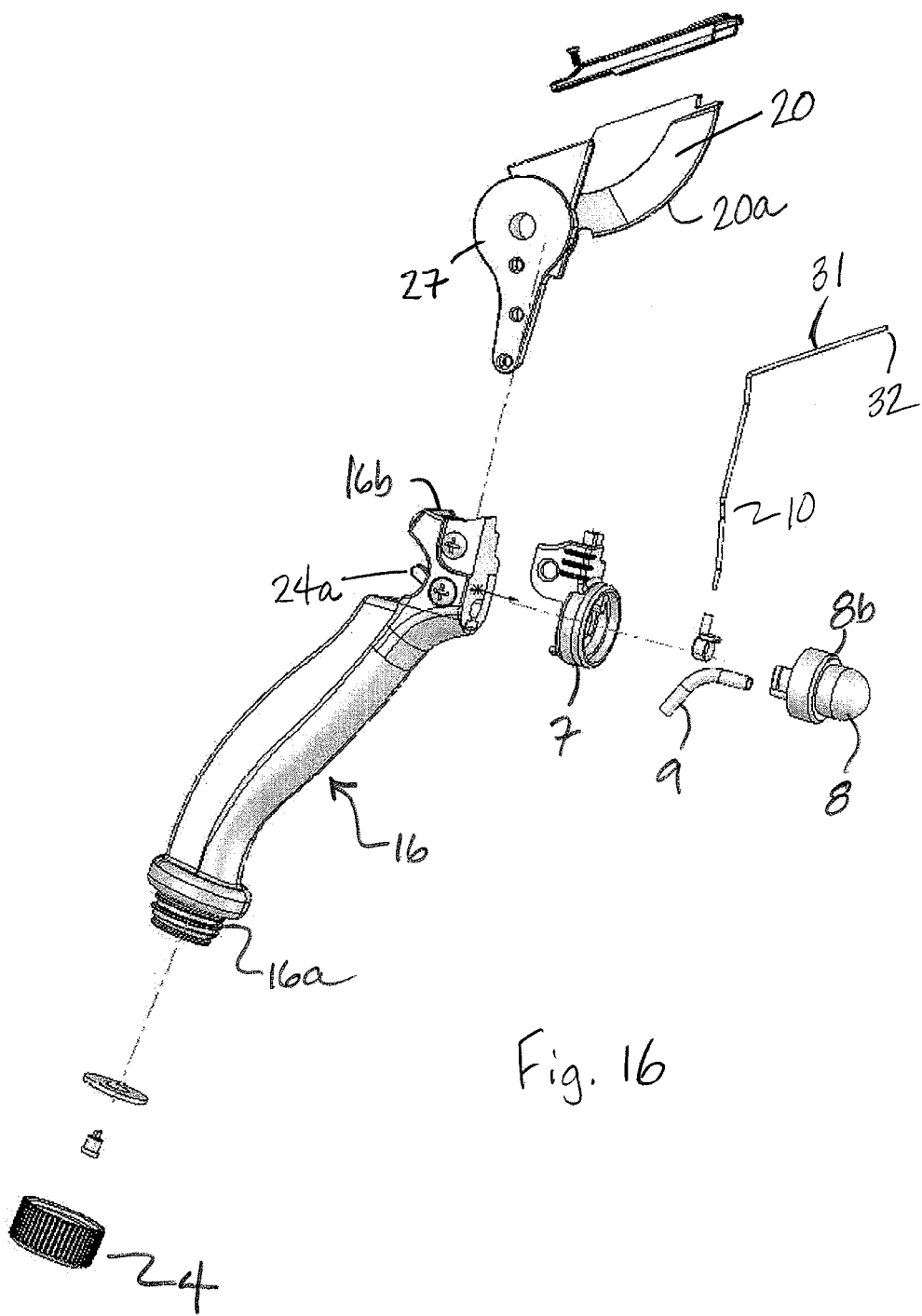
Figure 17:
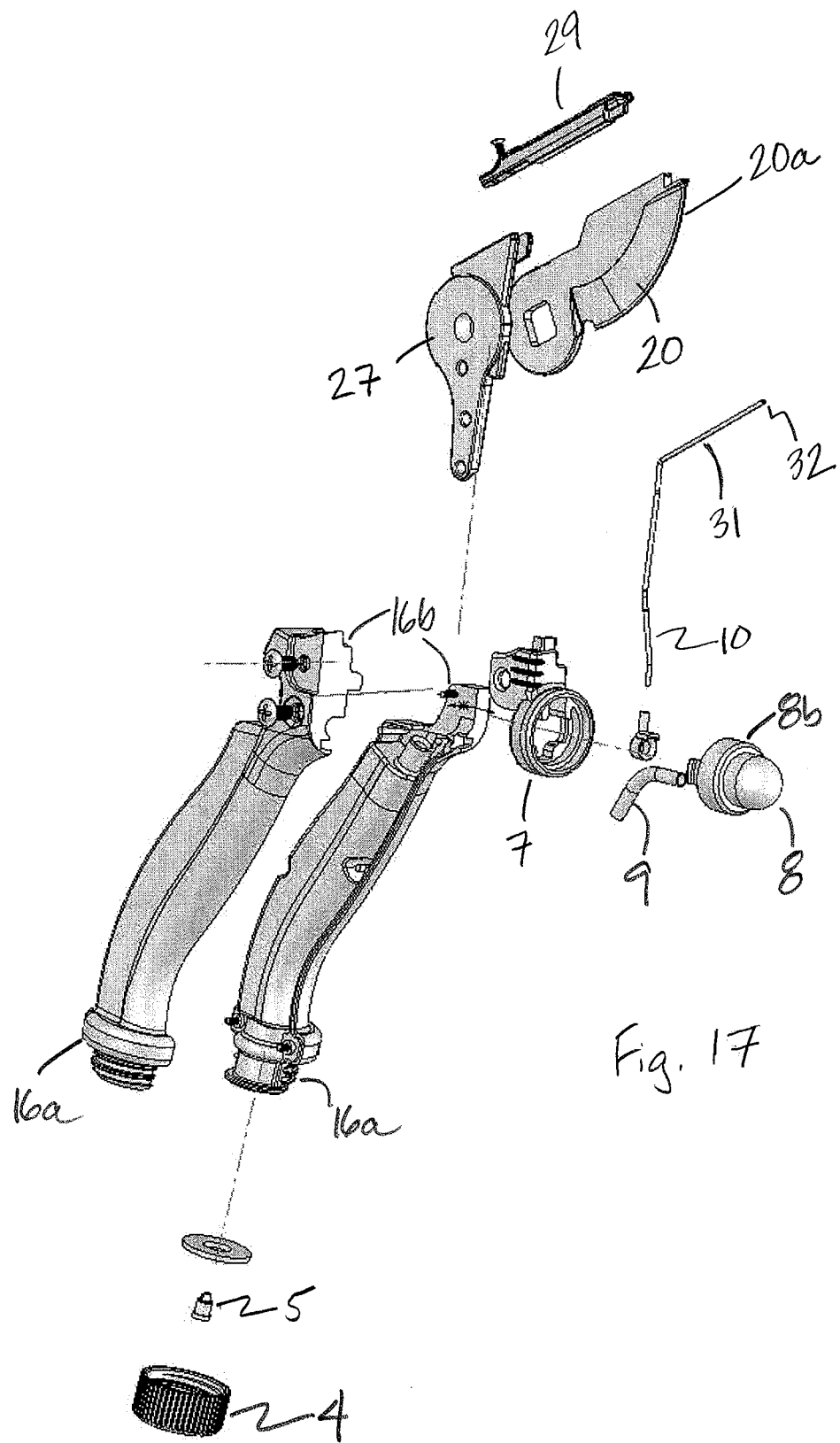
Figure 18:
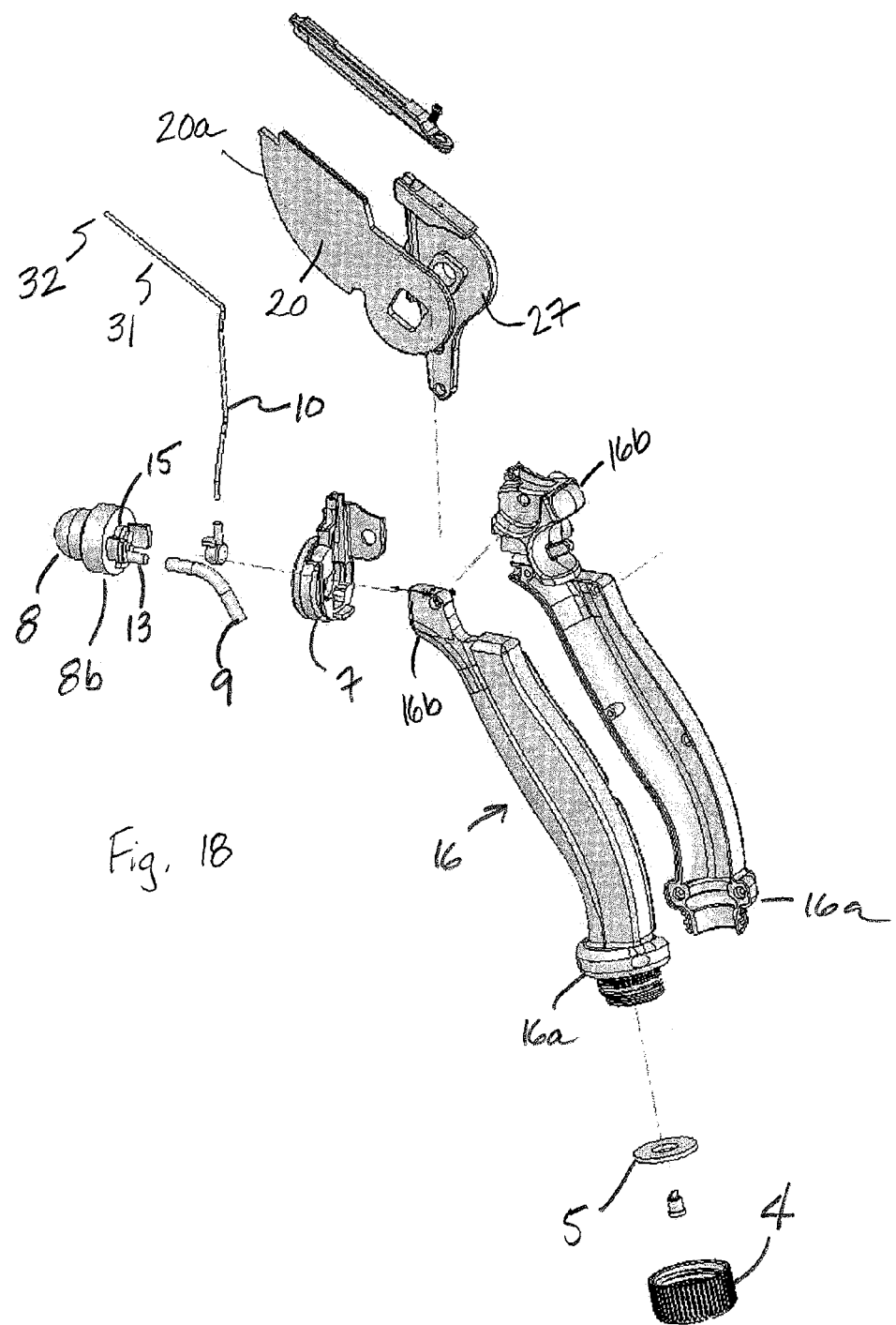

Looking to FIG. 3, the pruners 1 include a spring 24 or similar mechanism is positioned between the handles 14, 16 to apply a outwardly-directed spring pressure A forcing the handles 14, 16 apart in a resting position. The spring 24 is positioned between the proximal ends 14b, 16b of the handles 14, 16 on spring mounts 25a. The user will apply an inwardly-directed cutting pressure B on the handles 14, 16, which is substantially opposite to the spring force A, to draw the handles 14, 16 toward each other as well as the blades 20, 22 attached to the handles 14, 16. As the blades 20, 22 are drawn together, they will cut the plant or other objects positioned between the blades 20, 22. When force or pressure B is removed from the handles 14, 16 via release by the user, the spring 24 will direct the handles 14, 16 in direction A to the static or resting position.

Figure 19:
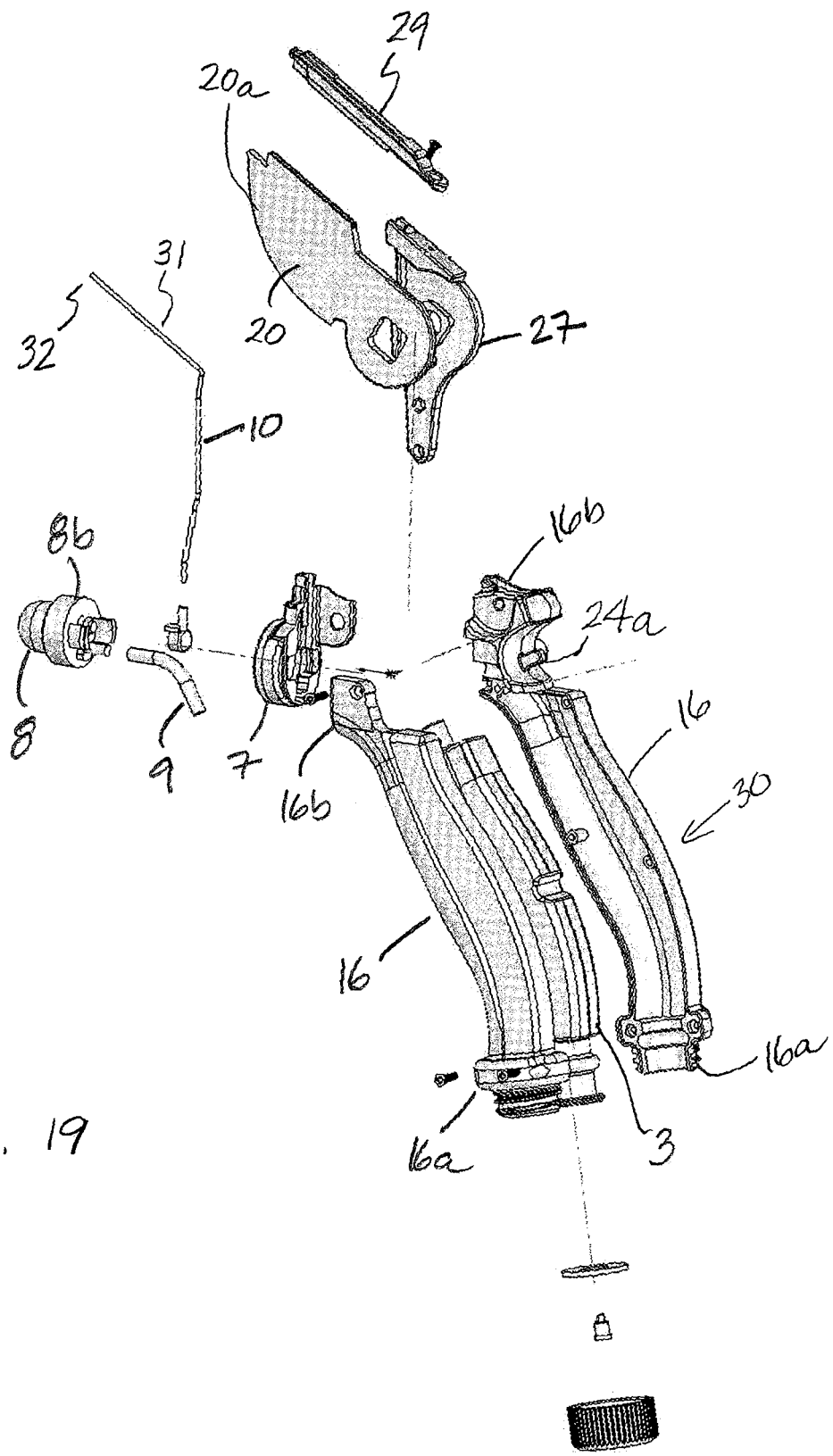
Figure 20:
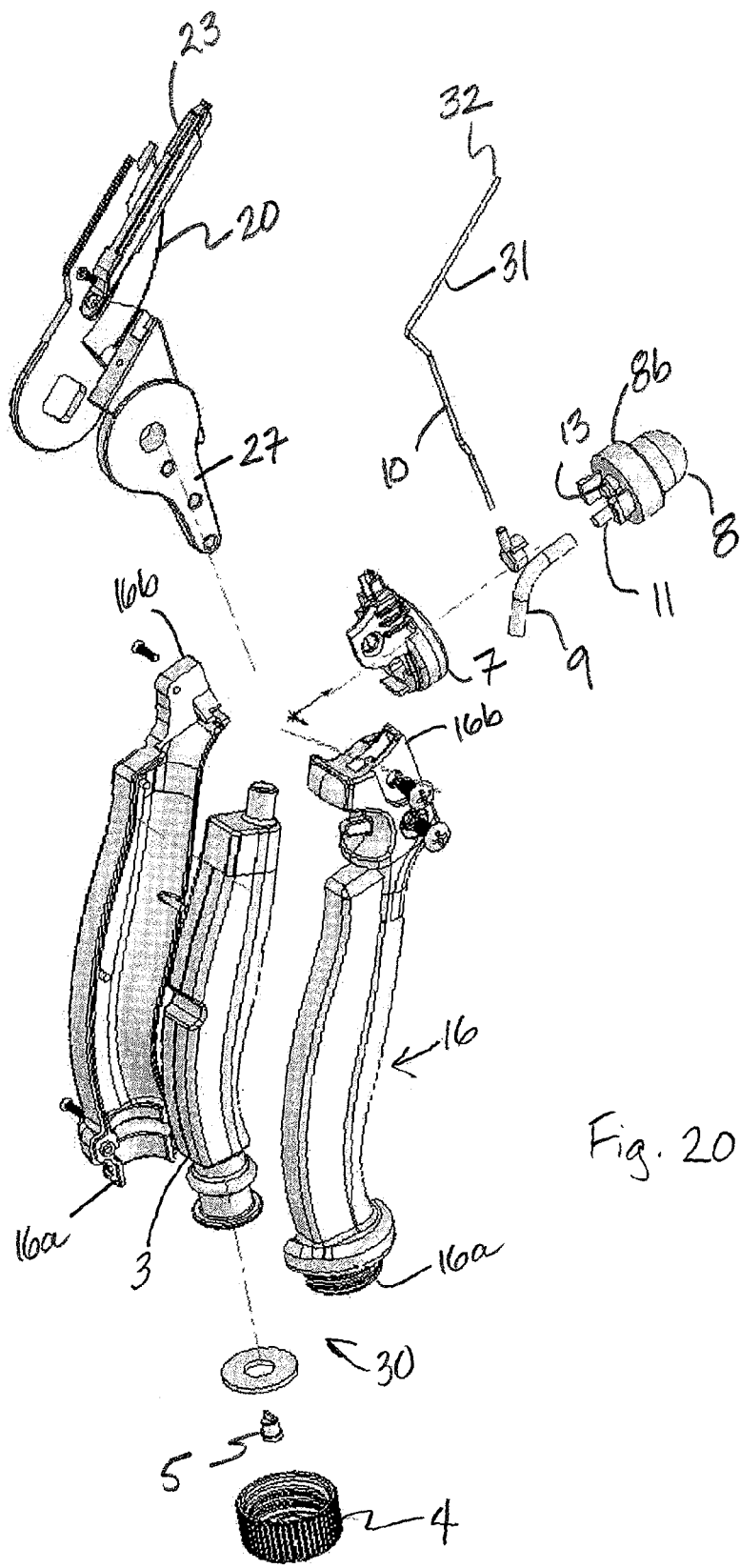

Looking to FIGS. 5-24, a chemical applicator 30 is affixed to or designed within the second arm handle 16 of the clipper 1 to allow the user to selectively distribute an herbicide, insecticide, or some other chemical to vegetation in the general proximity of work, such as a weed or brush material near the item being cut. As shown in FIGS. 19-20, the chemical applicator 30 includes a tank or similar container 3 that is affixed to or actually comprises the distal end 16a of the second arm handle 16. The chemical applicator 30 further includes a squeezable or depressible bulb 8 that is also fitted to the second arm handle 16 via a bulb insert 7. Looking to FIGS. 1 and 13-20, the bulb 8 is a squeezable rubber, plastic, or other flexible member that is connected to a substantially rigid base 8b. A bulb input connector 11 and a bulb output connector 13 traverse through and extend from the base 8b to allow fluids to pass into and out of the bulb 8. It is to be noted that the bulb 8 may take any shape in addition to the shape illustrated in the attached drawings, with the function of the bulb 8 acting as a plunger to allow a user to draw a chemical from the tank 3 and force it out through a distribution conduit 31 described herein.

Referring to FIGS. 19-20, the tank 3 includes a hollow housing acting as a reservoir storing a preferred chemical, such as an herbicide, to be used as desired for a particular application (e.g., using the chemical to kill weeds and undesired plant life). The tank 3 is housed in the second arm handle 16 with has an open end, with a threaded outer surface to receive cap or bottle top 4 at the distal end 16a. Opposite the open or distal end is a substantially closed end with the tank output connector 3a connected thereto.

The tank 3 is connected to the bulb 8 via an input tube or hose 9; namely, the input tube 9 is connected to the tank output connector 3a of the tank 3 and to the bulb input connector 11 at the base 8b of the bulb 8. A second flexible output tube or hose 10 is also connected to an output connector 15 on the base 8b of the bulb 8. In the embodiments illustrated in the attached drawings, the output tube 10 may be joined with a distribution conduit or tube 31 that extends along the outer surface or traversing through one of the blades 22 of the clipper 1 to a distribution point 32, although the output tube 10 can take the place of the distribution conduit 31 if desired. Further, the embodiment in the attached figures illustrates the input tube 9 and the output tube 10 as enclosed within second handle 16, although these members may extend uncontained from the clipper 1 or otherwise positioned proximate the first blade 22 by a person of ordinary skill in order to protect the tubes 9, 10 from damage and to maintain a secure connection with the base 8b of the bulb 8

Figure 21A:
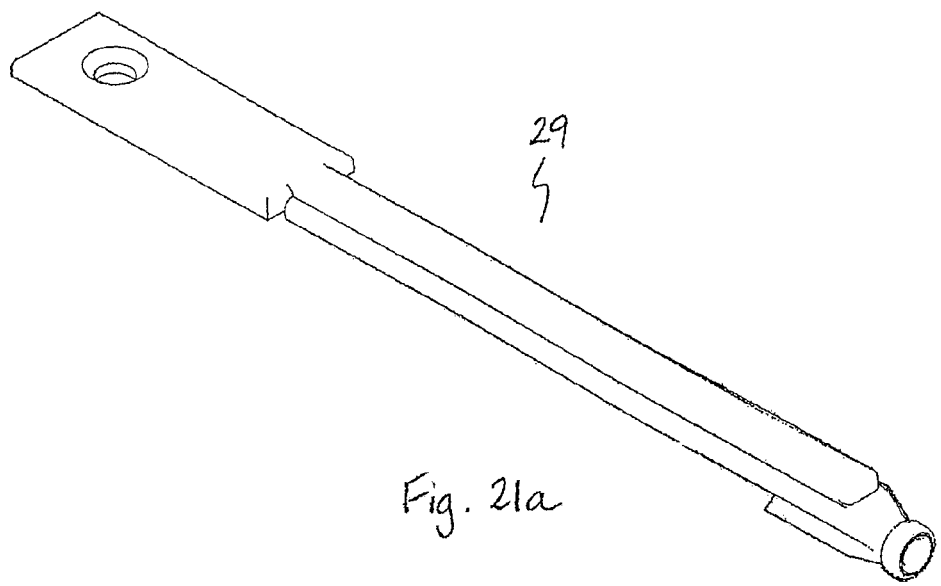
FIGS. 21a and 21b are perspective views of the FIG. 22 is a perspective view of the second arm handle.
Figure 21B:
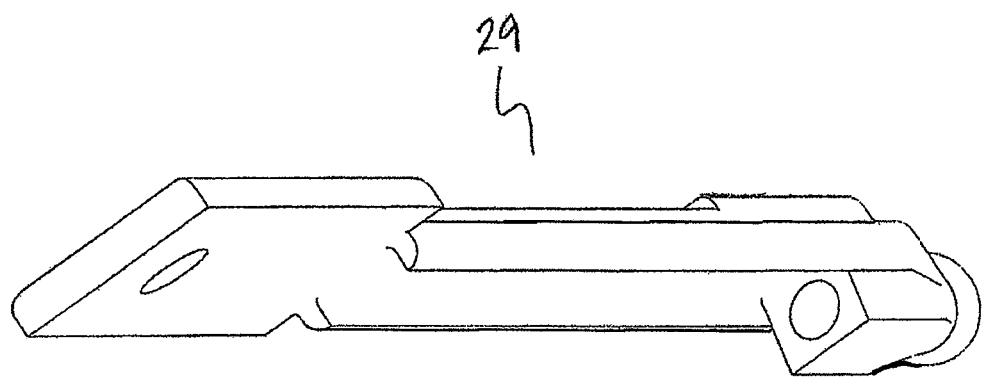
Figure 22:
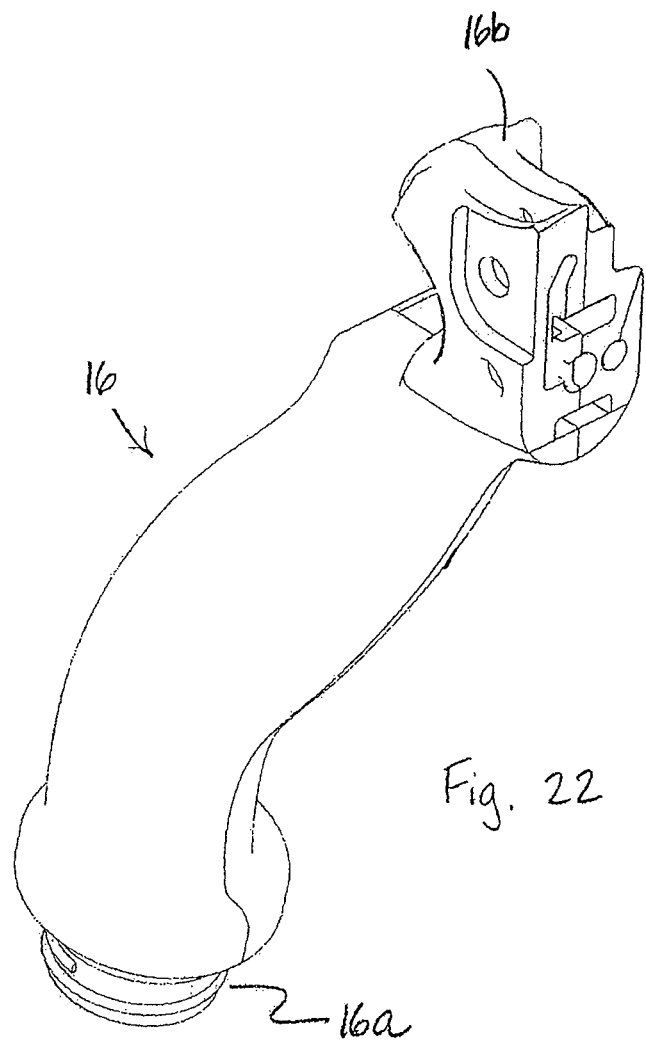
Figure 23:
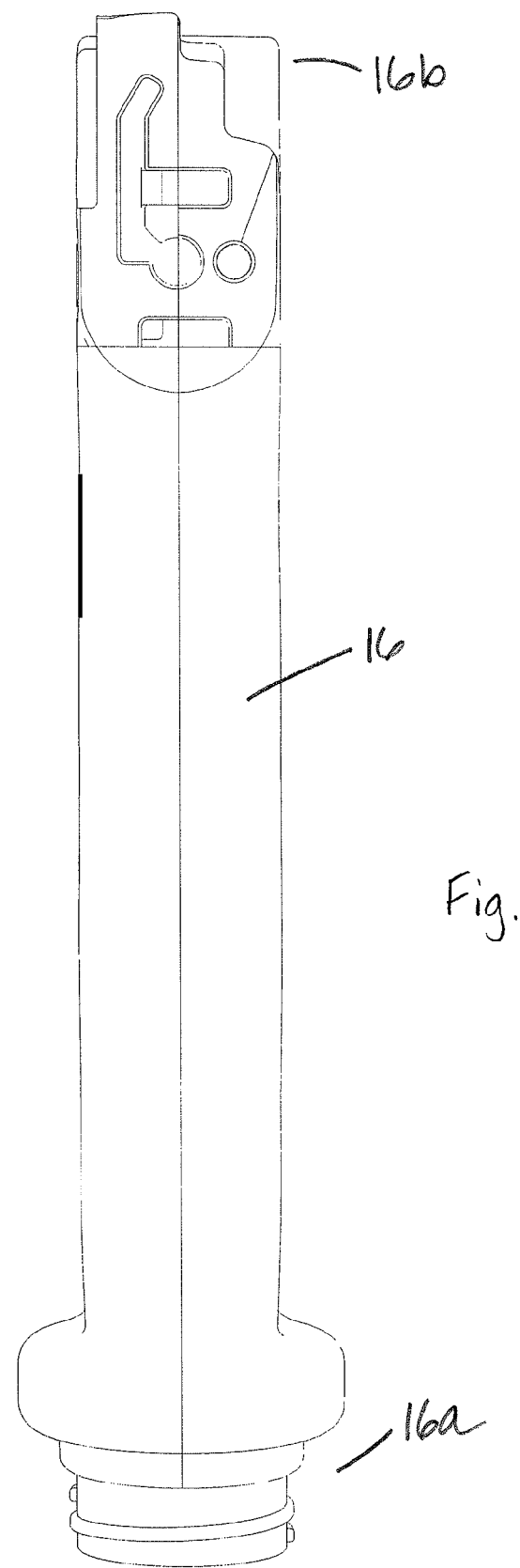
FIG. 23 is a front elevational view of the second arm handle illustrated in FIG. 22.
Figure 24:
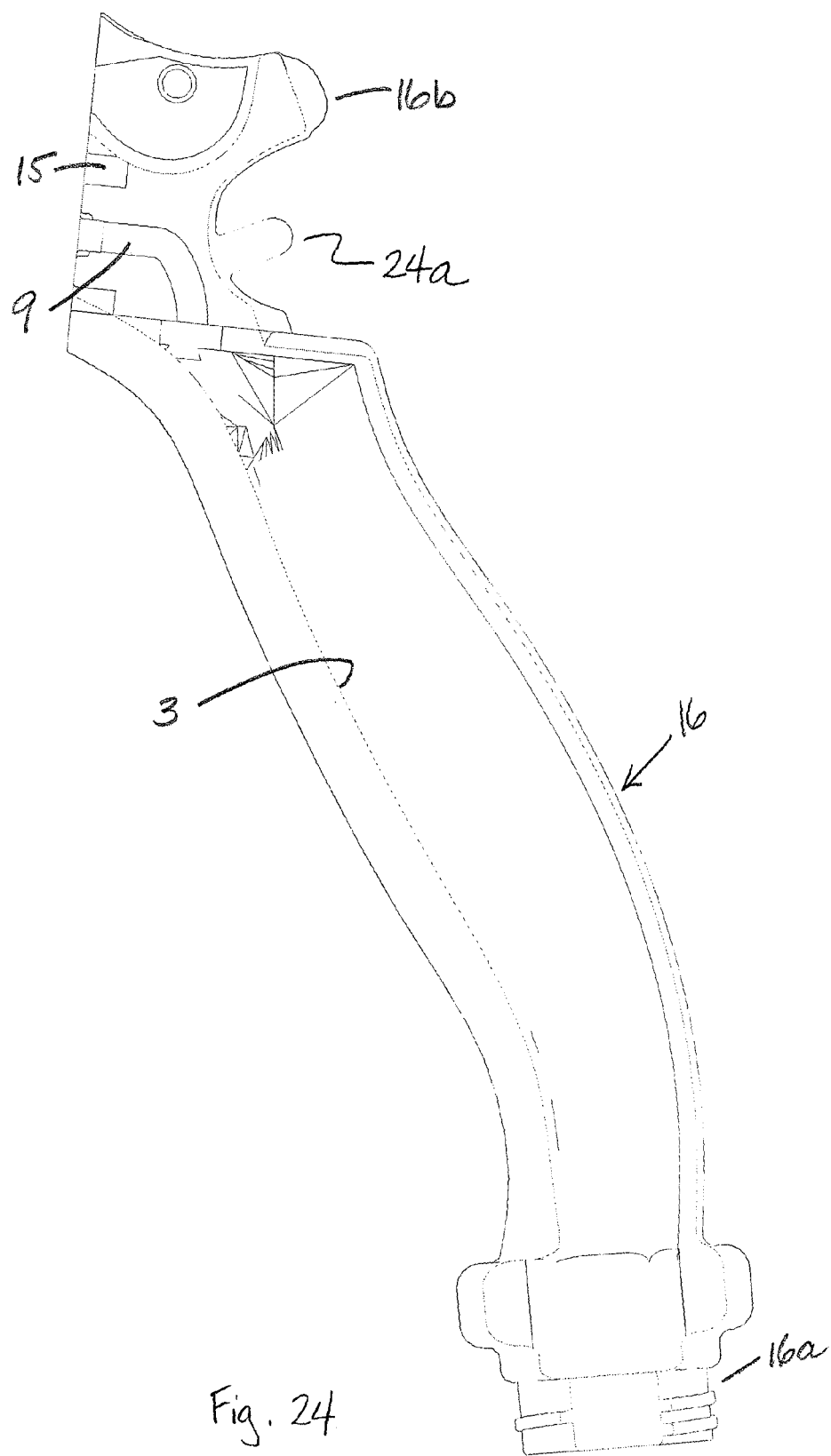
FIG. 24 is sectional view of the second arm handle illustrated in FIG. 22.
Figure 25:
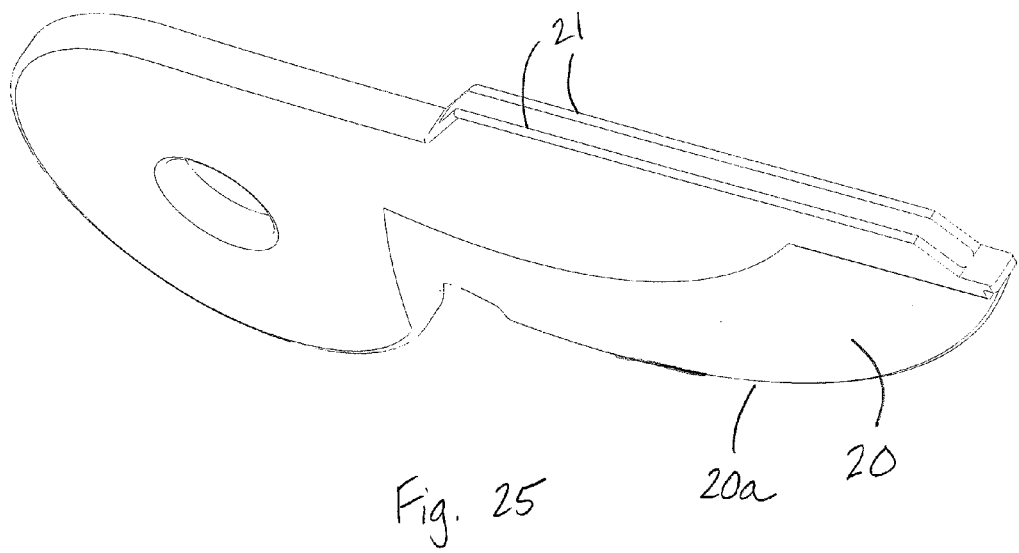
FIG. 25 is a perspective view of the second blade.
Figure 26:
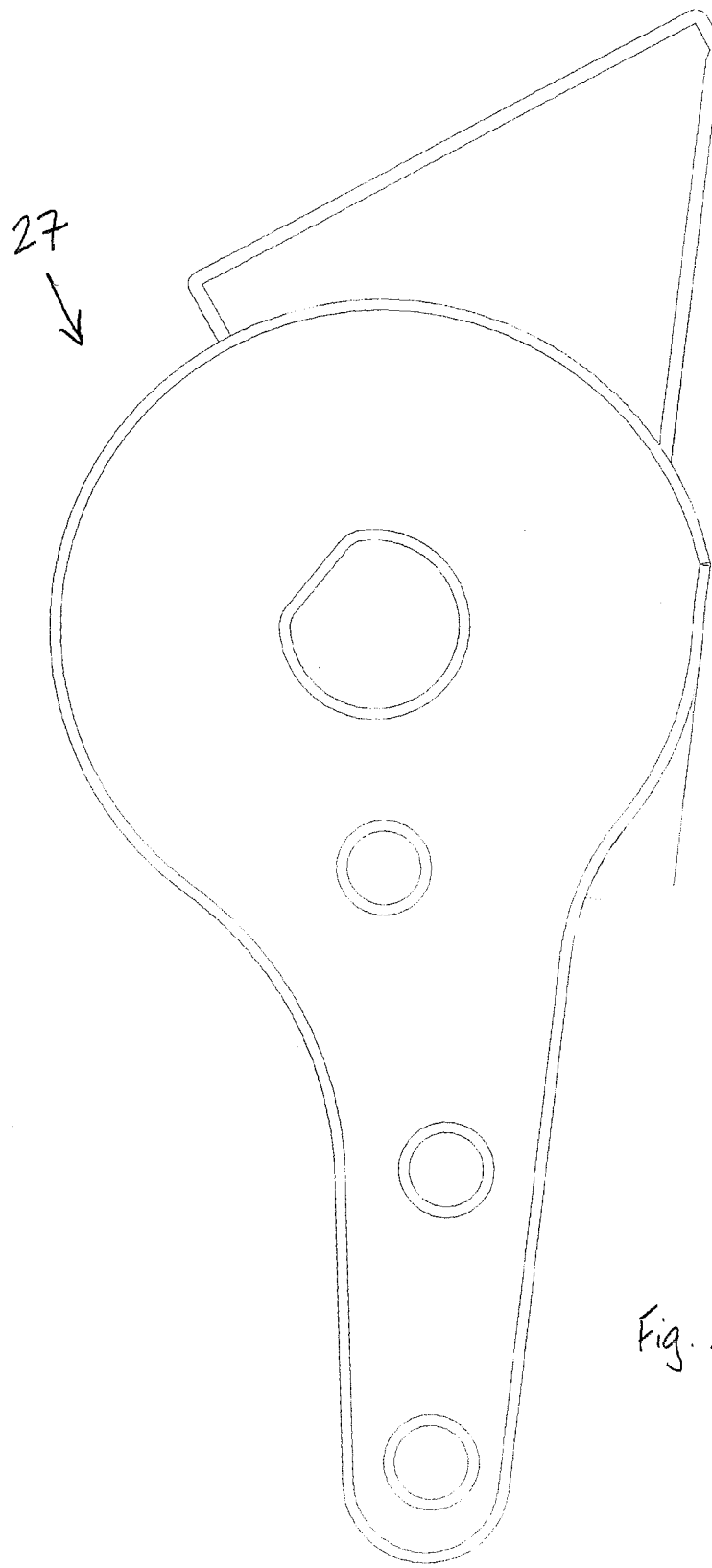
FIG. 26 is a side elevational view of the blade mount.
Figure 27:
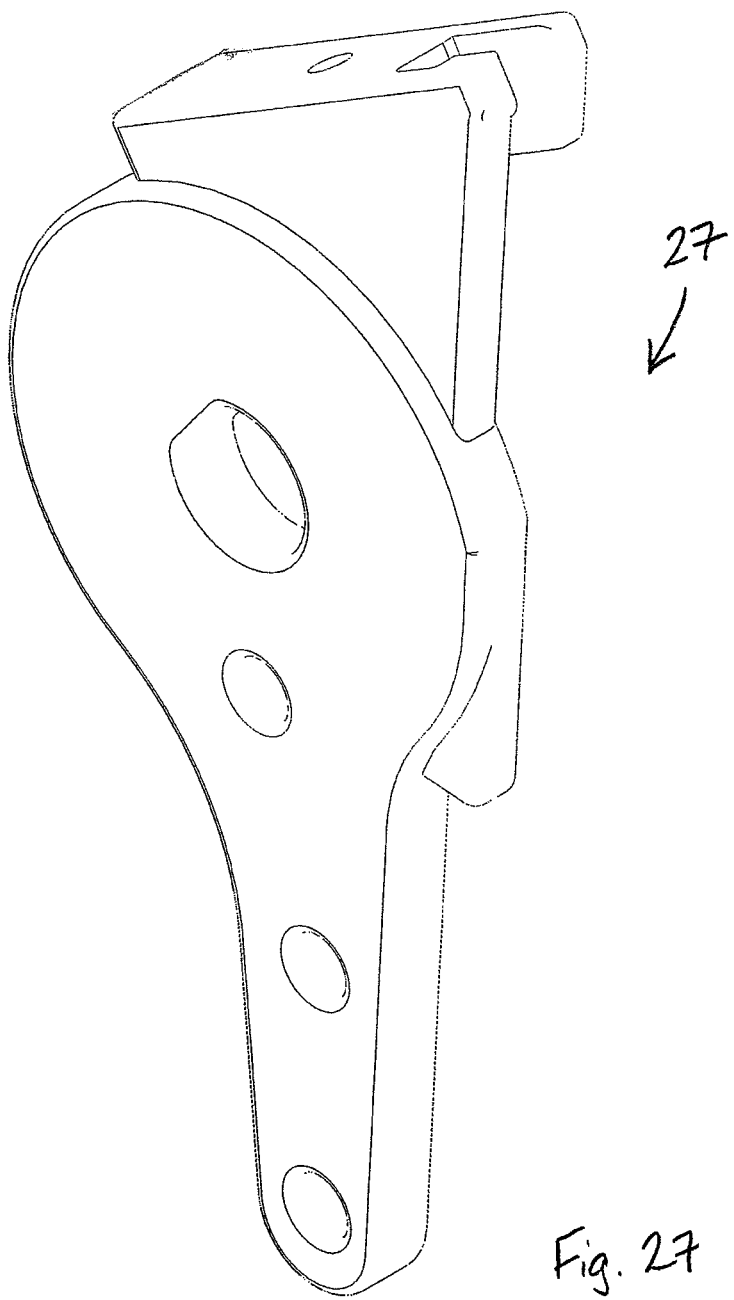
FIG. 27 is a perspective view of the blade mount.
Figure 28:
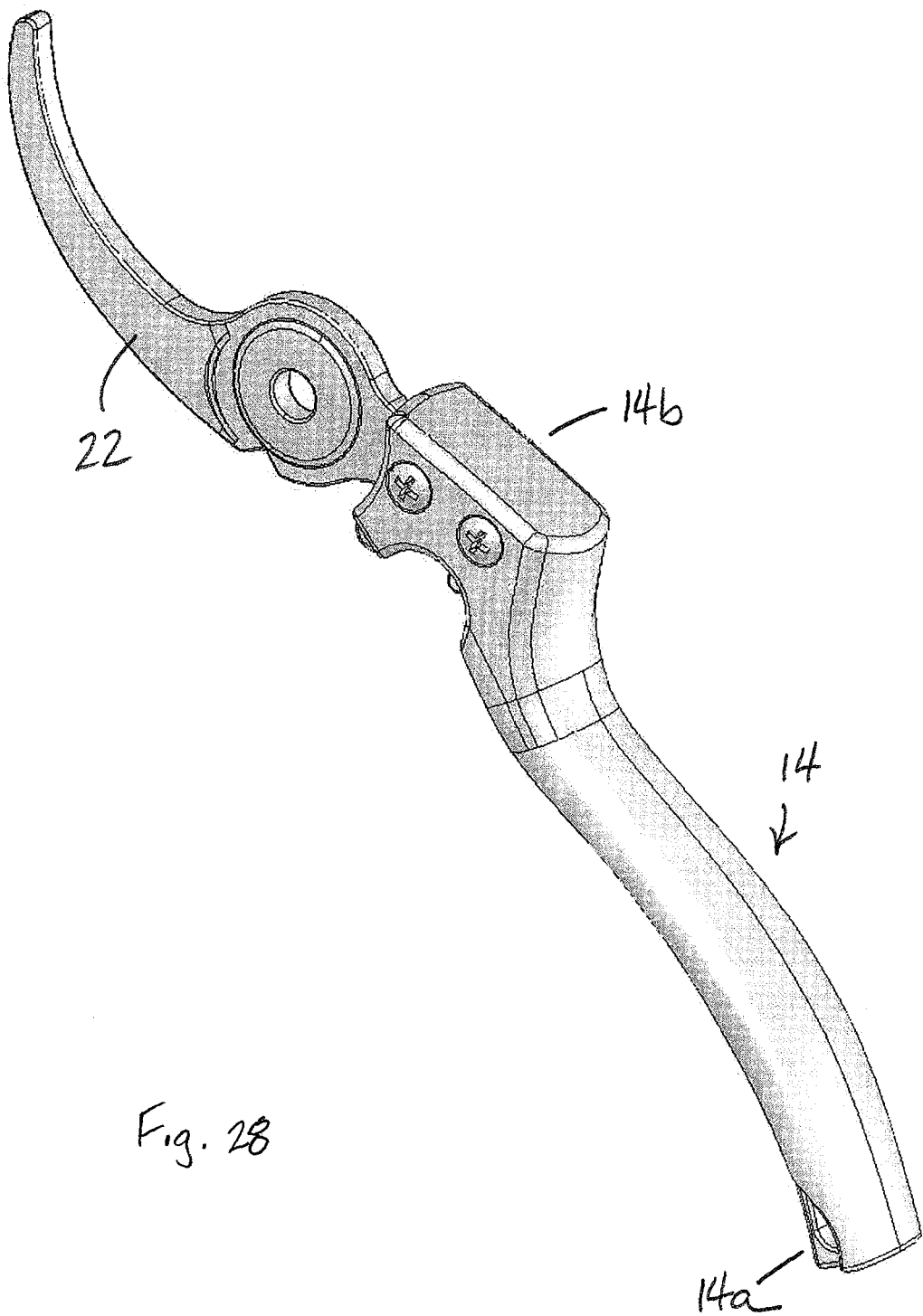
FIG. 28 is a perspective view of the first arm handle and blade.
Figure 29:
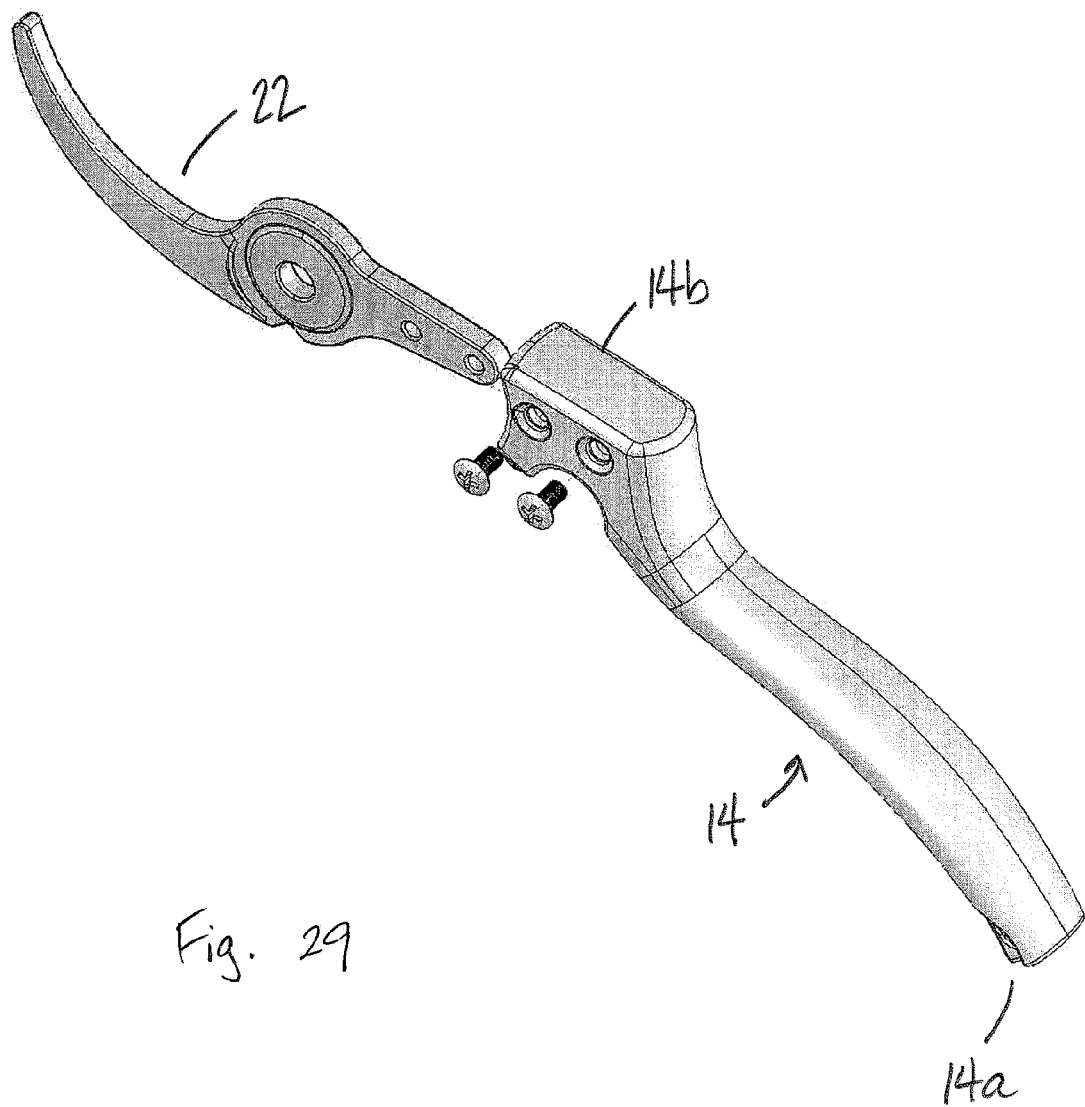
FIGS. 29 and 30 are exploded views of the first arm handle and blade.
Figure 30:
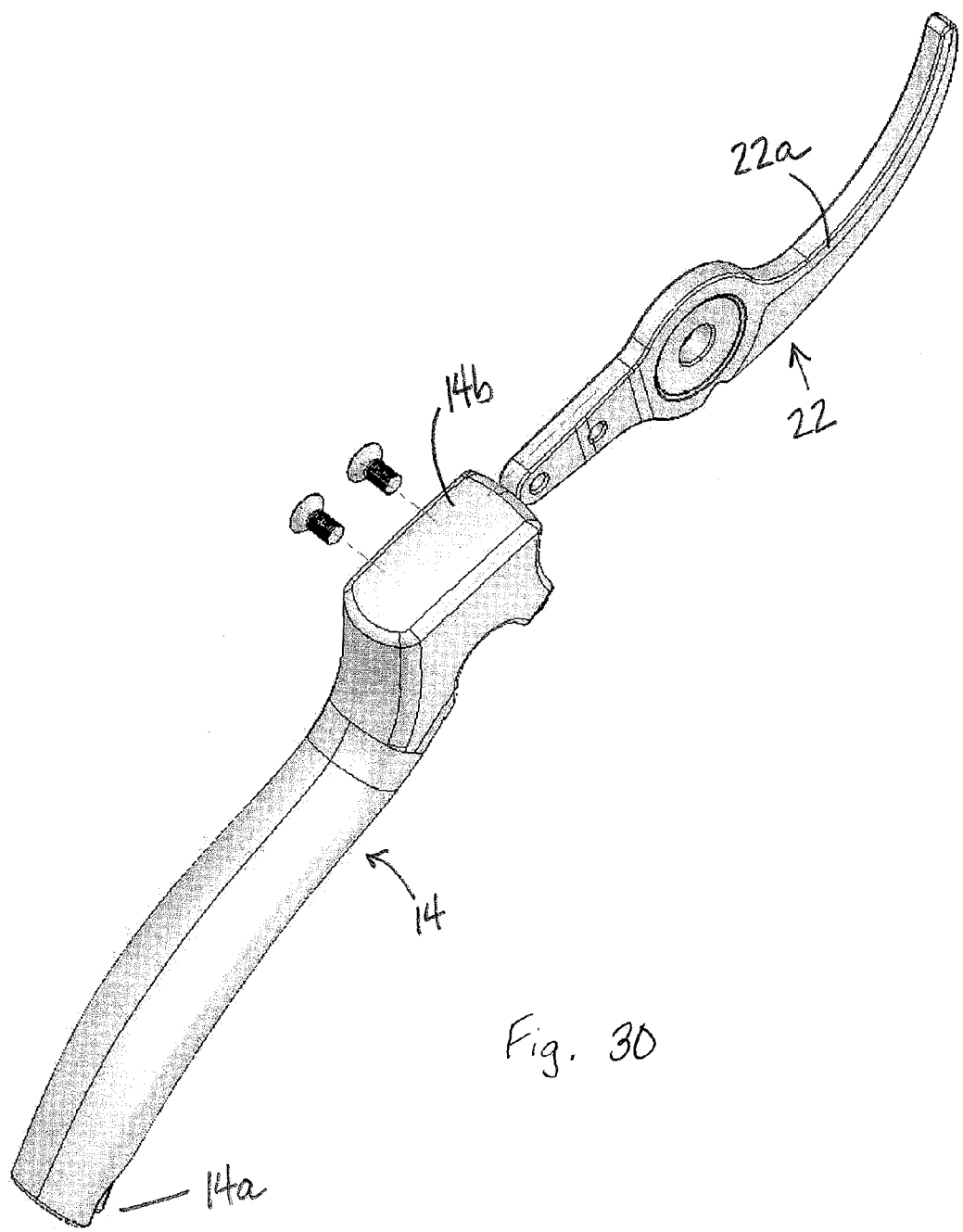
Figure 31:
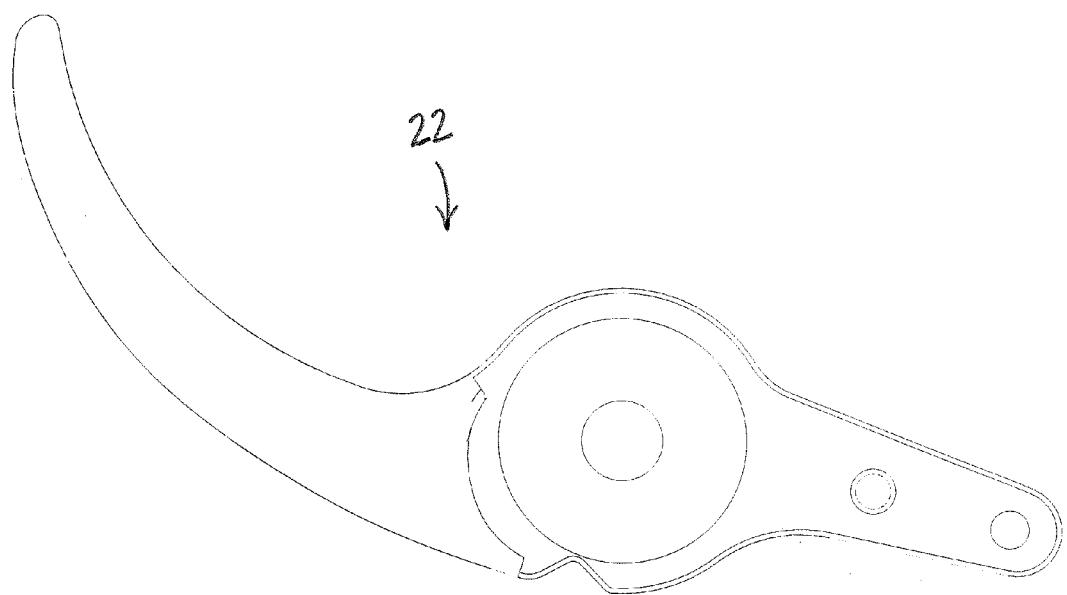
FIG. 31 is a side elevational view of the blade illustrated in FIG. 28.
Figure 32:
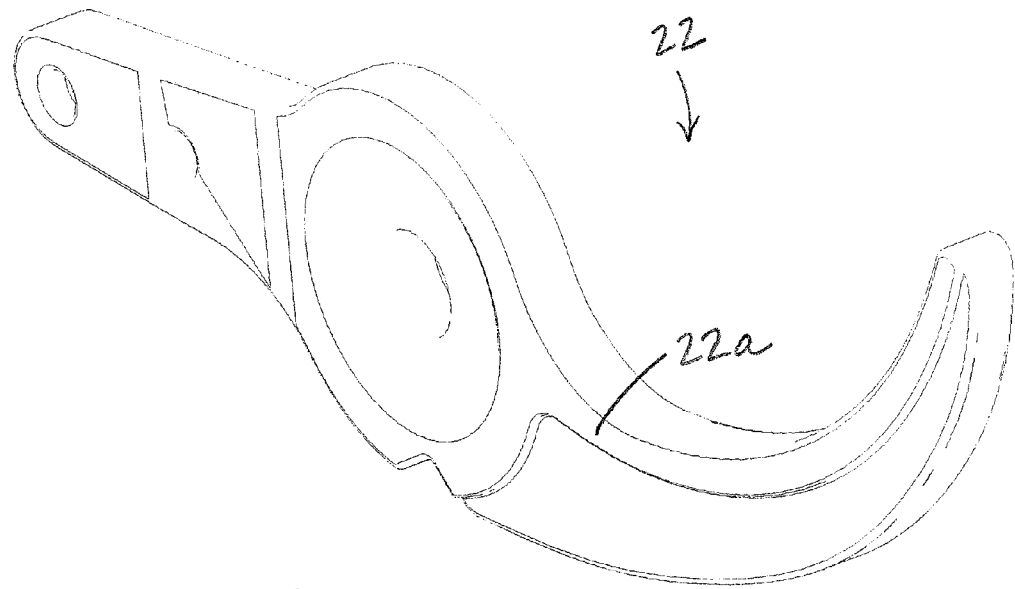
FIG. 32 is a perspective view of the blade illustrated in FIG. 28.
Figure 33:
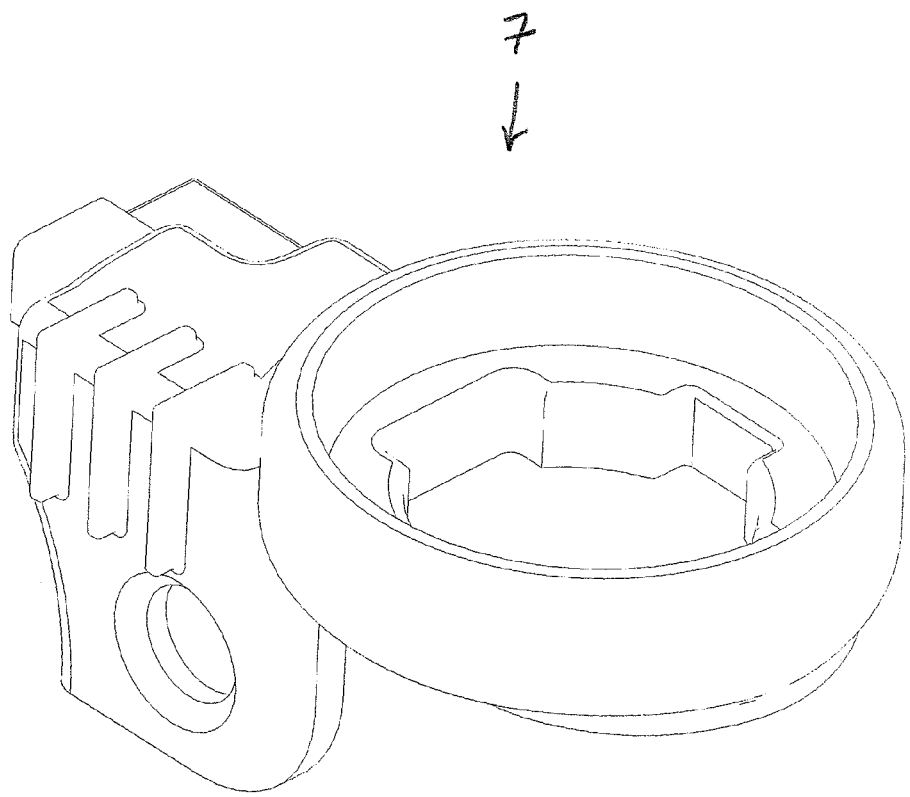
FIGS. 33 and 34 are views of the bulb insert.
Figure 34:
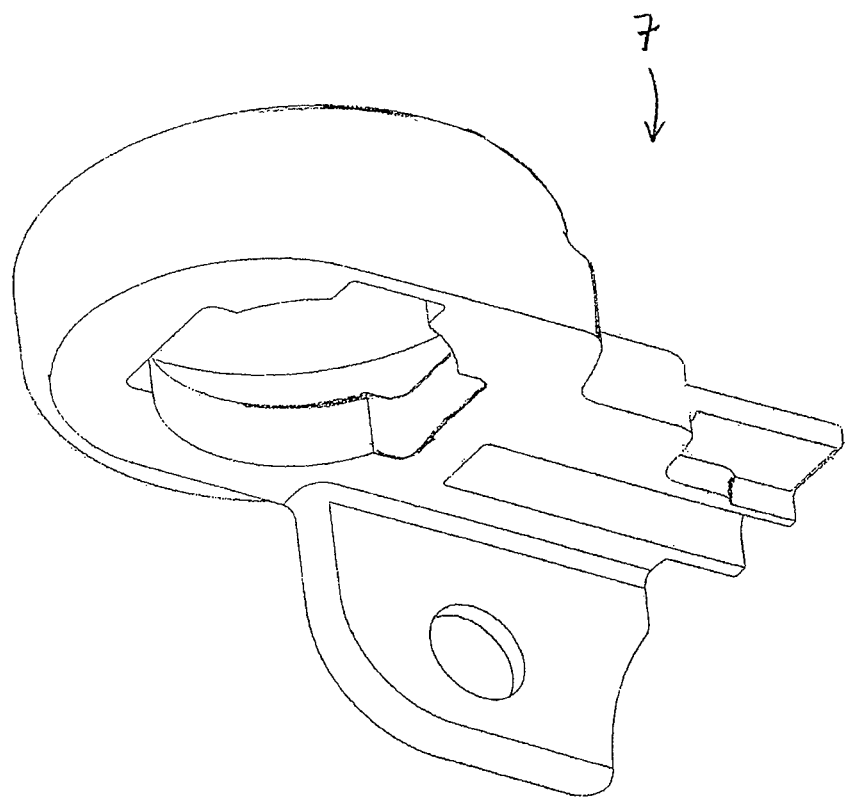

The distribution conduit 31, which may be connected to the output tube 10, is hollow, and may be made of a metal or other material that is more rigid than the flexible output tube 10. Looking to FIGS. 13-20, the distribution conduit 31 is positioned relative to the blades 20, 22 as desired, with the embodiment illustrated extending from the base 8b beyond the blades 20, 22 so that the chemical distribution point 32 is not proximate the blades 20, 22, and therefore the chemical will not accidentally engage the blades 20, 22. More particularly, looking to FIG. 25, a pair of flanges 21 extend above the upper edge of the second blade 20 to define a channel to store the distribution or application conduit 31. Thus the distribution conduit 31 will travel through the channel to the distribution point 32. Referring to FIGS. 21a and 21b, a channel plate 29 may be affixed to the second blade 20 to surround and fully protect the distribution conduit 31. An advantage to this design is that the chemical being dispersed will not engage the blades 20, 22, thus the user will not inadvertently apply the chemical to live and desirable plant.

Referring back to FIG. 13-20, a check valve 5 may be positioned in the housing proximate the cap 4, and it is affixed thereto to prevent unwanted leakage of the chemical from the tank 3. That is, the check valve 5 is a conventional one-way valve that allows the user to distribute the liquid into the tank 3 but prevents any of the liquid from exiting the tank 3 through the valve 5. Thus, in operation, the user will remove the cap 4 from the tank 3. Once the tank 3 is open, the user can distribute the desired chemicals (e.g., herbicide) into the tank 3 through the valve 5.

Referring back to FIGS. 1-4, the first arm handle 14 and the second arm handle 16 having an ergonomic design to easily fit in the users hand. That is, the first arm handle 14 has curved shape from proximal end 14b to distal end 14a to fit easily in the palm of the users hand, and more specifically, between the users thumb and forefinger. The second arm handle 16 has a curved shape substantially matching the shape of the first arm handle 14, with the second arm handle 16 easily being engaged by the user's fingers. The second arm handle 16 has an inner surface near said first arm handle 14 and an outer surface, with the bulb 8 being positioned at the proximal end 16a of the outer surface of the second arm handle 16. As a result, when the user is gripping the pruners 1, the bulb 8 is in a "trigger" position as that of a gun. Consequently, the user may easily engage the bulb 8 with the user's index finger when gripping the arm handles 14, 16 of the pruner 1. This further allows the user to simply and precisely dispense the chemical stored in the tank 3 at the desired time.

As noted in the embodiment described above, the second arm handle 16 includes the tank 3 that stores the desired fluid or chemicals for applying to or near the plants that are cut by the clippers 1. That is, at the exact time desired, the user will be able to dispense a chemical at a specific location by positioning the distribution point 32 of the clipper 1 at the specific desired location beyond an outermost edge of the blades 20, 22. The user will push the bulb 8 to expel the air or fluid contained therein. As the bulb 8 is released, the fluid stored in the tank 3 will be drawn into the bulb 8 through input hose 9. It may take more than one push of the bulb 8 to draw the fluid from the tank 3, but as the bulb 8 is pushed and released, chemicals from the tank 3 will be drawn into the bulb 8 through the input tube 9. Once the chemicals are present in the bulb 8, an additional push of the bulb 8 will transmit the chemicals from the bulb 8 through the output tube 10 and the distribution conduit 31, and ultimately to the distribution point 32 at the desired location, which could be onto the plant or weed being trimmed in the case of an herbicide, or on an insect in the case of an insecticide. Thus, the user can apply the herbicide at the place desired and at the time desired, such as to the plant that is currently being cut by the clipper 1.

Based on this process, it is clear that the clipper 1 does not dispense fluid every time the clipper 1 is used to trim plants unlike other designs. Rather, the chemicals are dispensed at a specific and desired time only upon pressing the bulb 8 along the front portion of the clipper 1. Therefore, the clippers 1 can be utilized to cut good plant material without fear of dispersing herbicide on the good plant, while also being used to cut undesirable material with the application of herbicide. Moreover, minimal herbicide will be used with this chemical applicator 30 corresponding to the size of the bulb 8. Thus, it is not intended for the entire blade 22 to be saturated with herbicide prior to the cut. These clippers 1 are small without a large appendage attached so the clippers 1 are easy to use and can be utilized in tight spaces with flexibility.

In operation, the user will unscrew the reservoir cap 4 and pour herbicide into the reservoir 3, preferably no more than 85% full to prevent unwanted leakage. The user then reattaches the cap 4 and may use the clippers 1 to prune a branch as desired. To apply the herbicide, the user will hold the tip of the blades down toward the area to be treated and press the bulb. Upon completion, the user will empty the reservoir of herbicide and flush the tank with soap and water. As with other gardening equipment, the device should be cleaned after each use and the blades should be oiled to improve the function and prolong the life of the clipper 1.

The embodiment of pruning clippers 1 illustrated in the attached figures is considered a hand clipper. However, it is to be noted that other clippers or shears may apply the present teachings for a device to allow the clipping of plants and maintenance of growth in the surrounding area. For example, the arm handles 14, 16 may be replaced by extended poles to allow the user to reach additional areas not permitted with conventionally sized hand grips. Additionally, although the embodiment illustrates that use of a separate tank 3 affixed to the second handle 16, it foreseeable that other embodiments may be implemented, such as forming the handle 16 with the reservoir 3 therein.

Having thus described exemplary embodiments of a PRUNING CLIPPER FOR DISPENSING A CHEMICAL TREATMENT, it should be noted by those skilled in the art that the within disclosures are exemplary only and that various other alternatives, adaptations, and modifications may be made within the scope of the invention. Accordingly, the invention is snot limited to the specific embodiments as illustrated herein, but is only limited by the following claims.

What is claimed is:

1. An improved pruning clipper comprising:
    a first handle having a distal end and a proximal end;
    a cutting edge connected to said proximal end of said first handle;
    a second handle having a distal end and a proximal end between an outer surface and an inner surface, said second handle pivotally connected to said first handle substantially close to said proximal ends of said first handle and said second handle;
    a second blade connected to said proximal end of said second handle, said second blade having an outermost edge opposite said distal end of said second handle;
    a tank supported within said second handle;
    a bulb connected to the outer surface of said proximal end of said second handle in a trigger position, said bulb connected to said tank using a first connector;
    a dispensing conduit extending along said second blade beyond the outermost edge of the second blade, said dispending conduit in communication with said bulb; and
    a pair of flanges extending about said second blade, said flanges defining a channel to receive said dispensing conduit.

2. The pruning clipper as described in claim 1, wherein said tank comprises:
    a housing having an opening at one end and an output connector opposing said opening;
    a cap detachably attached to said housing proximate said opening; and
    a valve connected to said opening of said housing to allow a fluid to flow into said housing.

3. The pruning clipper as described in claim 1, further comprising a spring connected between said proximal end of said first handle and said proximal end of said second handle.

4. The pruning clipper as described in claim 1 wherein said bulb comprises a rubber member affixed to a base, said base connected with said second handle.

5. The pruning clipper as described in claim 4 wherein said bulb is positioned on said second handle in a trigger position.

6. The pruning clipper as described in claim 1 further comprising a channel plate affixed to said second blade proximate said flanges.

* * * * *